(12) United States Patent
Yeh

(10) Patent No.: US 8,762,685 B2
(45) Date of Patent: Jun. 24, 2014

(54) DATA WRITING METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 548 days.

(21) Appl. No.: 13/038,392

(22) Filed: Mar. 2, 2011

(65) Prior Publication Data

US 2012/0151180 A1 Jun. 14, 2012

(30) Foreign Application Priority Data

Dec. 10, 2010 (TW) ................ 99143385 A

(51) Int. Cl.
*G06F 13/00* (2006.01)
*G06F 13/28* (2006.01)
*G06F 9/26* (2006.01)
*G06F 9/34* (2006.01)

(52) U.S. Cl.
USPC .............. 711/209; 711/103; 711/E12.078

(58) Field of Classification Search
None
See application file for complete search history.

(56) References Cited

U.S. PATENT DOCUMENTS

2010/0169544 A1* 7/2010 Eom et al. .............. 711/103

* cited by examiner

*Primary Examiner* — Eric S Cardwell
(74) *Attorney, Agent, or Firm* — Jianq Chyun IP Office

(57) ABSTRACT

A data writing method for writing updated data from a host into a memory module is provided. Herein, some physical units of the memory module are gotten to be global random physical units for storing data from the host. The method includes determining whether the updated data is sequential data and determining whether a logical page corresponding to the updated data is a start logical page. The method further includes getting a blank physical unit from the physical units as a new global random physical unit and writing the updated data into the new global random physical unit when the updated data is the sequential data and the logical page corresponding to the updated data is the start logical page. Accordingly, the method can write updated data belonging to the same logical unit into the same physical unit, thereby shortening the time for executing write commands.

23 Claims, 25 Drawing Sheets

DATA WRITING METHOD, MEMORY CONTROLLER AND MEMORY STORAGE APPARATUS

CROSS-REFERENCE TO RELATED APPLICATION

This application claims the priority benefit of Taiwan application serial no. 99143385, filed on Dec. 10, 2010. The entirety of the above-mentioned patent application is hereby incorporated by reference herein and made a part of this specification.

BACKGROUND

1. Technology Field

The present invention relates to a data writing method for a rewritable non-volatile memory, and a memory controller as well as a memory storage apparatus using the method.

2. Description of Related Art

Along with the widespread of digital cameras, cell phones, and MP3 in recently years, demands for storage media have increased drastically. With characteristics such as non-volatility of data, low power consumption, small volume, non-mechanical structure, and high access speed, the rewritable non-volatile memory is one of the most adaptable storage media for portable electronics devices, for example, notebook computers. A solid state drive is a memory storage apparatus adopting a flash memory as its storage medium. Consequently, the flash memory industry has become a very important part of the electronic industry in recent years.

A memory sub-module of a flash memory module has a plurality of physical units, and each of the physical units has a plurality of physical pages, wherein data must be written into a physical unit according to the sequence of the physical pages in the physical unit. Additionally, a physical page that has been written with data has to be erased before it is used again for writing updated data. In particular, data is erased with one physical unit as the smallest unit, and data is programmed (also referred to as writing) with one physical page as the smallest unit. Therefore, in the management of the flash memory module, the physical units are grouped into a data area and a free area.

The physical units belonging to the data area are used for storing data written by the host system. Specifically speaking, a memory management circuit of a memory storage apparatus converts a logical access address to be accessed by the host system to a logical page of a logical unit and maps the logical page of the logical unit to a physical page of a physical unit in the data area. In other words, in the management of the flash memory module, the physical units in the data area are considered as physical units already used (e.g., stored with data written by the host system). For instance, the memory management circuit uses a logical unit-physical unit mapping table to record a mapping relationship between the logical units and the physical units in the data area, wherein the logical pages of the logical units sequentially correspond to the physical pages of the physical units.

The physical units belonging to the free area are used to substitute the physical units in the data area. In particular, as described above, the physical units that have written with data have to be erased before it is used for writing updated data again. Accordingly, the physical units belonging to the free area are used for writing with updated data to be written into logical units and substituting the physical units originally mapped to the logical units. Hence, the physical units in the free area are either blank or available physical units (i.e., no data is recorded in these blocks or the data recorded in these blocks is marked as invalid data).

In other words, the physical pages of the physical units belonging to the data area and the free area are mapped alternatively to the logical pages of the logical units for storing data written by the host system. As an example, the memory management circuit of the memory storage apparatus gets one or more physical units from the free area to be one or more global random physical units and writes updated data into a physical page of the global random physical units when the logical access address into which the host system is about to write updated data corresponds to a certain logical page of a certain logical unit of the memory storage apparatus. Furthermore, the memory management circuit records updated information of the updated logical page in a global random physical unit search table. In other words, the global random physical unit search table records valid data of a logical unit is written into which physical pages of which global random physical units. Accordingly, when updated data of a certain logical page of a certain logical unit is stored in a global random physical unit, the memory management circuit may look up the global random physical unit search table to read the valid data belonging to the logical unit.

In such a structure in which the global random physical unit is used for writing data from the host system, the global random physical units may possibly be filled very soon if the host system continuously writes a large amount of sequential data into the memory storage apparatus. At this time, if the free area does not have enough physical units to be a new global random physical unit, the memory management circuit has to perform a data merging procedure in order to continue executing the write command and to prevent the physical units in the free area from being exhausted.

More specifically, in the data merging procedure, the memory management circuit gets a blank physical unit and copies valid data belonging to the same logical unit to the gotten physical unit from the global random physical units and the data area. As such, the global random physical units or the physical units in the data area that store only invalid data may be erased and associated with the free area. The data merging procedure significantly prolongs the time for executing the write command, and thereby possibly causing timeout. Hence, how to reduce execution of the above data merging procedure so as to increase efficacy of the memory storage apparatus has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data writing method and a memory controller capable of reducing execution of the above data merging procedure and thereby effectively shortening the time required for executing a write command.

The present invention provides a memory storage apparatus capable of completing a write command in less time.

An exemplary embodiment of the present invention provides a data writing method for writing updated data from a host system to a rewritable non-volatile memory module, wherein the rewritable non-volatile memory module has a plurality of physical blocks, each of the physical blocks has a plurality of physical pages, the physical blocks are grouped into at least a data area and a free area, the physical blocks belonging to the data area and the free area are grouped into a plurality of physical units, and the physical units in the free area are used to substitute the physical units in the data area for writing data. The data writing method includes configuring a plurality of logical units to map to the physical units in the data area, wherein each of the logical units has a plurality of logical pages and the updated data belongs to one of the logical pages. The data writing method further includes getting a physical unit from the free area to be a first global random physical unit. In addition, the data writing method also includes determining whether the updated data is sequential data and whether a logical page corresponding to the updated data is a start logical page. The data writing method further includes getting a physical unit from the free area to be a second global random physical unit and writing the updated data into the second global random physical unit if the updated data is sequential data and the logical page corresponding to the updated data is the start logical page. Herein, sequential data is defined to be data sequentially written by the host system into a plurality of continuous logical pages.

Furthermore, an exemplary embodiment of the present invention further provides a memory controller for controlling a rewritable non-volatile memory module, wherein the rewritable non-volatile memory module has a plurality of physical blocks, and each of the physical blocks has a plurality of physical pages. The memory controller includes a host interface, a memory interface, and a memory management circuit. The host interface is configured for coupling to a host system. The memory interface is configured for coupling to the rewritable non-volatile memory module. The memory management circuit is coupled to the host interface and the memory interface and configured for writing updated data to the rewritable non-volatile memory module. The memory management circuit groups the physical blocks into at least a data area and a free area, and groups the physical blocks belonging to the data area and the free area into a plurality of physical units, wherein the physical units in the free area are used for substituting the physical units in the data area for writing data. Furthermore, the memory management circuit configures a plurality of logical units to map to the physical units in the data area, wherein each of the logical units has a plurality of logical pages, and the updated data belongs to one of the logical pages. In addition, the memory management circuit further gets a physical unit from the free area to be a first global random physical unit. Moreover, the memory management circuit also determines whether the updated data is sequential data and whether a logical page corresponding to the updated data is a start logical page. The memory management circuit gets a physical unit from the free area to be a second global random physical unit and writes the updated data into the second global random physical unit if the updated data is sequential data and the logical page corresponding to the updated data is the start logical page. Herein, sequential data is defined to be data sequentially written by the host system to a plurality of continuous logical pages.

An exemplary embodiment of the present invention provides a memory storage apparatus including a connector, a rewritable non-volatile memory module and a memory controller. The connector is configured for coupling to a host system. The rewritable non-volatile memory module has a plurality of physical blocks, and each of the physical blocks has a plurality of physical pages. The memory controller is coupled to the connector and the rewritable non-volatile memory module and configured for writing updated data into the rewritable non-volatile memory module. The memory controller groups the physical blocks into at least a data area and a free area, and groups the plurality of physical blocks belonging to the data area and the free area into a plurality of physical units, wherein the physical units in the free area are for substituting the physical units in the data area for writing data. Furthermore, the memory controller configures a plurality of logical units to map to the physical units in the data area, wherein each of the logical units has a plurality of logical pages, and the updated data belongs to one of the logical pages. The memory controller further gets a physical unit from the free area to be a first global random physical unit. In addition, the memory controller determines whether the updated data is sequential data and whether a logical page corresponding to the updated data is a start logical page. The memory controller gets a physical unit from the free area to be a second global random physical unit and writes the updated data into the second global random physical unit if the updated data is sequential data and the logical page corresponding to the updated data is the start logical page. Herein, sequential data is defined to be data sequentially written by the host system to a plurality of continuous logical pages.

In addition, an exemplary embodiment of the present invention further provides a data writing method for a rewritable non-volatile memory module, wherein the rewritable non-volatile memory module has a plurality of physical blocks, each of the physical blocks has a plurality of physical pages, the physical blocks are grouped into at least a data area and a free area, the physical blocks belonging to the data area and the free area are grouped into a plurality of physical units, the physical units in the data area map to a plurality of logical units, each of the logical units has a plurality of logical pages, and a first physical unit of the physical units in the free area is used as a current global random physical unit for writing data. The data writing method includes (a) receiving at least a write command from a host system and a plurality of updated data corresponding to the write command, wherein each of the updated data corresponds to one of the logical pages; (b) determining whether the plurality of updated data are sequential data, and if yes, a first flag is marked; (c) sequentially selecting one of the updated data that has not been written based on the logical pages corresponding to the plurality of updated, data and continuing to step (d); (d) determining whether the first flag has been marked, if no, executing step (h), and if yes, executing step (e); (e) determining whether a second flag has been marked, if no, executing step (f), and if yes, executing step (i); (f) determining whether the logical page corresponding to the updated data is a start logical page, if yes, executing step (g), and if no, executing step (h); (g) getting a second physical unit from the free area, sequentially writing the updated data into the second physical unit, setting the second physical unit as the current global random physical unit, marking the second flag and then executing step (j); (h) sequentially writing the updated data into the current global random physical unit, recording updated information of the logical page corresponding to the updated data in a global random physical unit search table and then executing step (j); (i) sequentially writing the updated data into the current global random physical unit, not recording updated information of the logical page corresponding to the updated data in the global random physical unit search table and then executing step (j); and (j) determining whether all the updated data has been written into the rewritable non-volatile memory, and if no, executing step (c).

As described above, the data writing method, the memory controller, and the memory storage apparatus of the exemplary embodiments of the present invention are capable of effectively writing data stored by a host system in a sequential writing mode into a rewritable non-volatile memory module.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
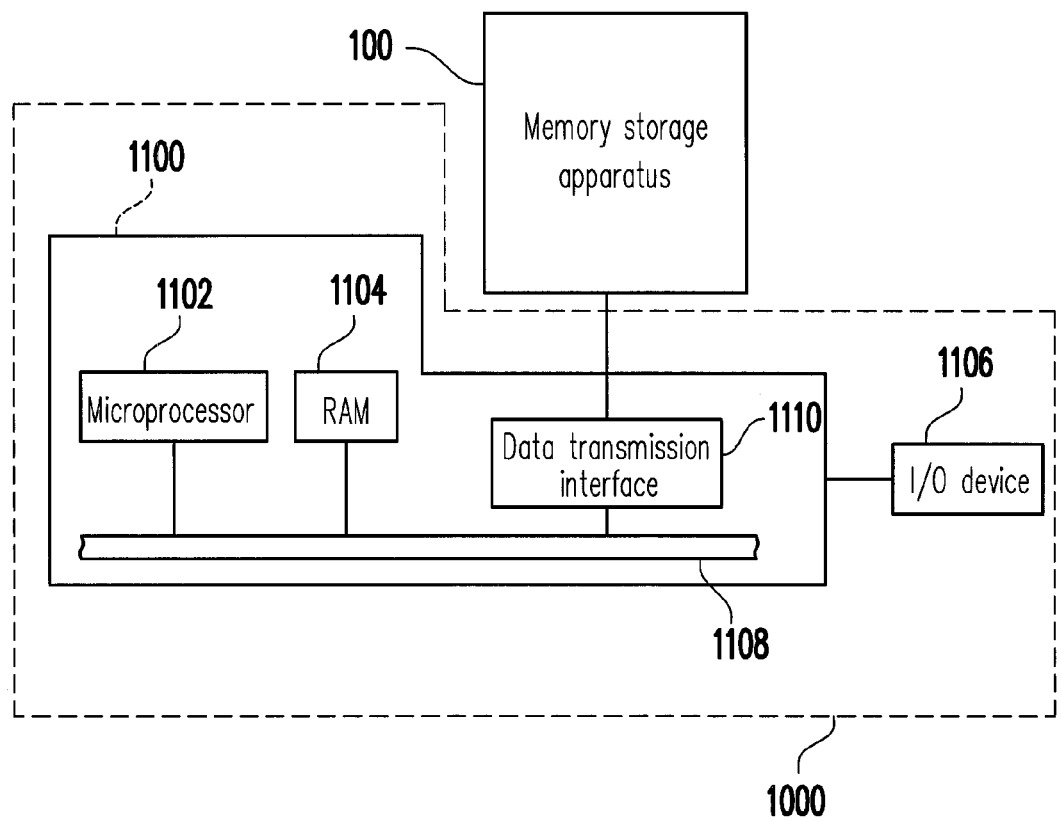
FIG. 1A illustrates a host system and a memory storage apparatus according to the first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage apparatus (also referred to as a memory storage system) includes a rewritable non-volatile memory module and a controller (also called a control circuit). The memory storage apparatus is usually used together with a host system so that the host system can write data into or read data from the memory storage apparatus.

FIG. 1A illustrates a host system and a memory storage apparatus according to one exemplary embodiment of the present invention.

Figure 1B:
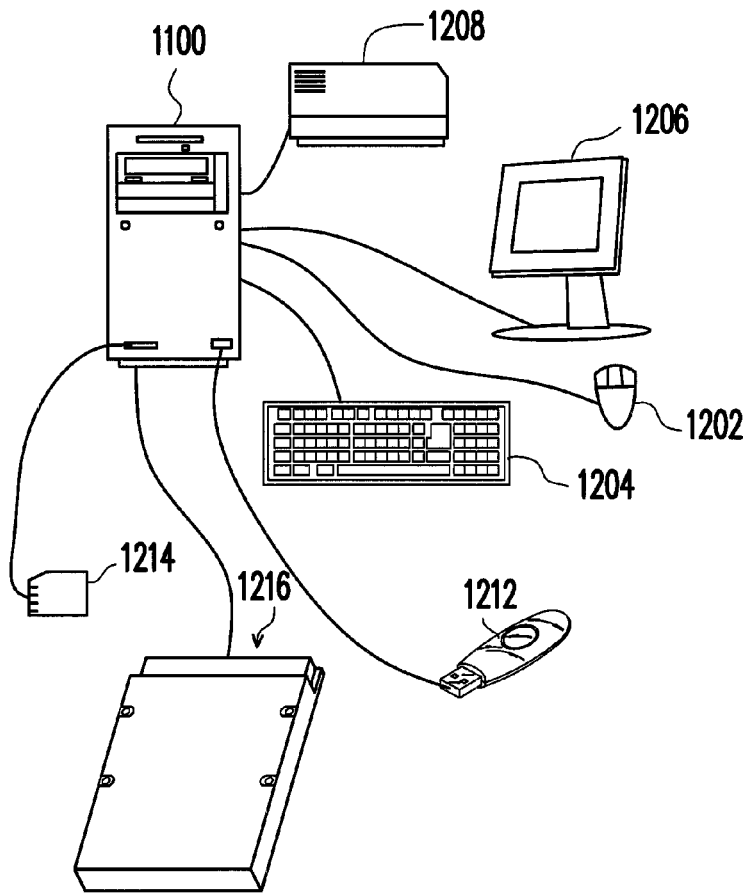
FIG. 1B is a schematic diagram illustrating a computer, an input/output (I/O) device, and a memory storage apparatus according to an exemplary embodiment of the present invention.

Referring to FIG. 1A, a host system 1000 generally includes a computer 1100 and an input/output (I/O) device 1106. The computer 1100 includes a microprocessor 1102, a random access memory (RAM) 1104, a system bus 1108, and a data transmission interface 1110. The I/0 device 1106 includes a mouse 1202, a keyboard 1204, a display 1206, and a printer 1208 as shown in FIG. 1B. It should be noted that the devices illustrated in FIG. 1B do not limit the I/O device 1106, and the I/O device 1106 may further include other devices.

In the exemplary embodiment of the present invention, a memory storage apparatus 100 is coupled to other devices of the host system 1000 through the data transmission interface 1110. Through operations of the microprocessor 1102, the random access memory (RAM) 1104, and the Input/Output (I/0) device 1106, data may be written into or read from the memory storage apparatus 100. For example, the memory storage apparatus 100 may be a rewritable non-volatile memory storage apparatus such as a flash drive 1212, a memory card 1214, or a solid state drive (SSD) 1216 as shown in FIG. 1B.

Figure 1C:
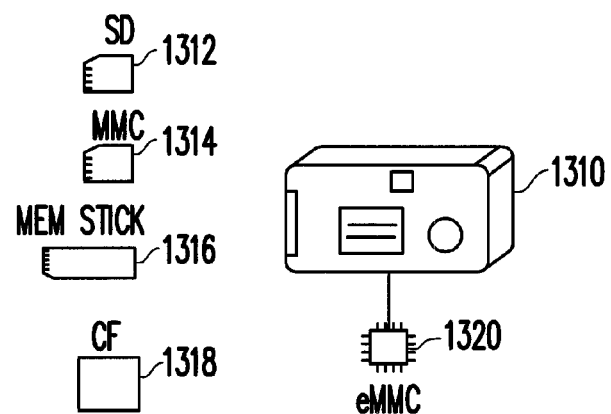
FIG. 1C is a schematic diagram of a host system and a memory storage apparatus according to another exemplary embodiment of the present invention.

Generally, the host system 1000 is substantially any system capable of operating with the memory storage apparatus 100 to store data. Even though the host system 1000 is described as a computer system in the present exemplary embodiment, in another exemplary embodiment of the present invention, the host system 1000 may also be a digital camera, a video camera, a communication device, an audio player, or a video player, etc. For example, if the host system is a digital camera (video camera) 1310, the rewritable non-volatile memory storage apparatus is then an SD card 1312, an MMC card 1314, a memory stick 1316, a CF card 1318, or an embedded storage device 1320 (as shown in FIG. 1C). The embedded storage device 1320 includes an embedded MMC (eMMC). It should be noted that the eMMC is directly coupled to the substrate of the host system.

Figure 2:
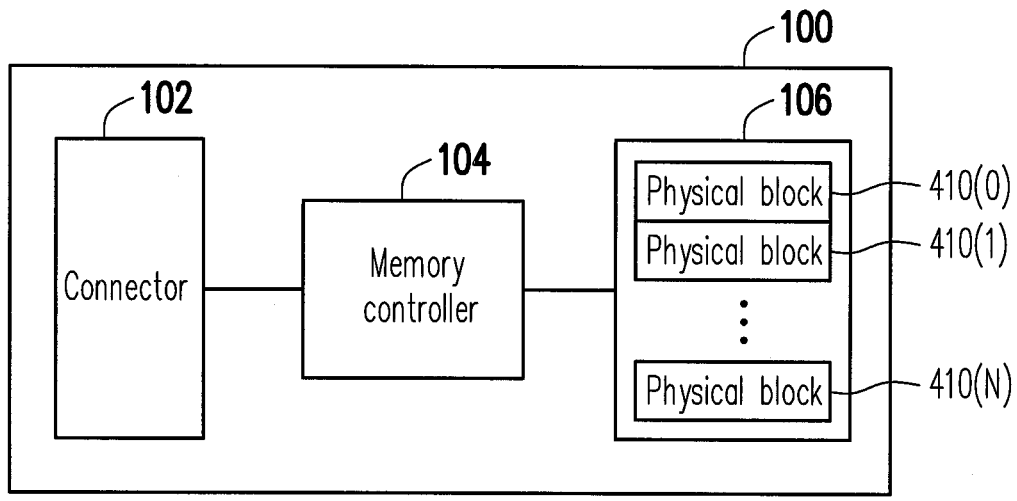
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 is a Serial Advanced Technology Attachment (SATA) connector. However, it should be noted that the present invention is not limited to the aforementioned description and the connector 102 also can be an institute-of-electrical-and-electronic-engineers (IEEE) 1394 connector, a peripheral-component Interconnect-express (PCI Express) connector, a universal serial bus connector, a secure digital (SD) interface connector, a memory stick (MS) interface connector, a multi-media-card (MMC) interface connector, a compact flash (CF) interface connector, an integrated-device-electronics (IDE) connector or other suitable type of connectors.

The memory controller 104 executes a plurality of logic gates or control instructions implemented in a hardware form or a firmware form and performs various data operations such as data writing, reading, and erasing in the rewritable non-volatile memory module 106 according to commands from the host system 1000.

The rewritable non-volatile memory module 106 is coupled to the memory controller 104 to store data written by the host system 1000. The non-volatile memory module 106 has physical blocks 410(0)~410(N). For example, the physical blocks 410(0)~410(N) may belong to one memory die or different memory dies. Each of the physical blocks respectively has a plurality of physical pages, each of the physical pages has at least one physical sector, wherein the physical pages belonging to the same physical block can be written individually but have to be erased all together. For example, each physical block includes 128 physical pages, and each physical page has 8 physical sectors. In other words, in the example where each physical sector has 512 bytes, each physical page has a capacity of 4 Kilobytes. However, it should be noted that the present invention is not limited thereto and the number of the physical pages of each physical block may be 64,256 or any other suitable values.

In more detail, the smallest unit for erasing is one physical block. That is, each physical block contains the least number of memory cells that are erased together. In addition, the smallest unit for programming is one physical page. That is, one physical page is the smallest unit for writing data. However, it is to be understood that in another exemplary embodiment of the present invention, the smallest unit for writing data may also be a physical sector or other sizes. Each physical page usually includes a data bit area and a redundant bit area. The data bit area is used for storing user data, and the redundant bit area is used for storing system data (for example, the ECC code).

According to the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory modules, or other memory modules having the same characteristics.

Figure 3:
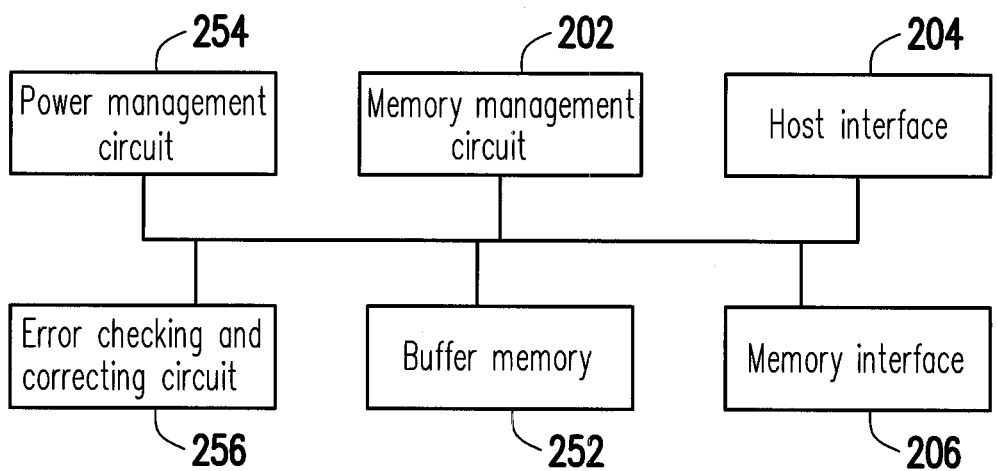
FIG. 3 is a schematic block diagram of a memory controller according to an exemplary embodiment of the present invention.

FIG. 3 is a schematic block diagram of a memory controller according to an exemplary embodiment of the present invention.

Referring FIG. 3, the memory controller 104 includes a memory management circuit 202, a host interface 204, and a memory interface 206.

The memory management circuit 202 is configured for controlling all operations of the memory controller 104. To be specific, the memory management circuit 202 has a plurality of control instructions, which are executed to perform data writing, reading, erasing, etc. . . . when the memory storage apparatus 100 is in operation.

In the present exemplary embodiment, the control instructions of the memory management circuit 202 are implemented in a firmware form. For example, the memory management circuit 202 has a micro-processor unit (not shown) and a read-only memory (not shown), and these control instructions are burned into the read-only memory. When the memory storage apparatus 100 is in operation, the control instructions are executed by the micro-processor unit to perform data writing, reading, erasing, etc. . . .

In another exemplary embodiment of the present invention, the control instructions of the memory management circuit 202 are stored in a specific area (for example, the system area of the memory module exclusively used for storing system data) of the rewritable non-volatile memory module 106 in the form of program codes. Additionally, the memory management circuit 202 may have a micro-processor unit (not shown), a read-only memory (not shown), and a random access memory (not shown). In particular, the read-only memory has driver codes, and when the memory controller 104 is enabled, the micro-processor unit first executes the driver codes to load the control instructions stored in the rewritable non-volatile memory module 106 into the random access memory of the memory management circuit 202. Afterward, the micro-processor unit executes the control instructions to perform data writing, reading, erasing, etc. . . . Additionally, in another exemplary embodiment of the present invention, the control instructions of the memory management circuit 202 may also be implemented in a hardware form.

The host interface 204 is coupled to the memory management circuit 202 and configured for receiving and identifying commands and data from the host system 1000. In other words, the commands and data from the host system 1000 are transmitted to the memory management circuit 202 through the host interface 204. In the present exemplary embodiment, the host interface 204 is compatible with the SATA standard. However, it should be understood that the present invention is not limited thereto, and the host interface 204 may be compatible with the PATA standard, the IEEE 1394 standard, the PCI express standard, the USB standard, the SD standard, the MS standard, the MMC standard, the CF standard, the IDE standard, or other suitable data transmission standards.

The memory interface 206 is coupled to the memory management circuit 202 and configured for accessing the rewritable non-volatile memory module 106. That is, data to be written into the rewritable non-volatile memory module 106 is converted by the memory interface 206 into a format acceptable to the rewritable non-volatile memory module 106.

In another exemplary embodiment of the present invention, the memory controller 104 further includes a buffer memory 252. The buffer memory 252 is coupled to the memory management circuit 202 for temporarily storing data and commands from the host system 1000 or data from the rewritable non-volatile memory module 106.

In one exemplary embodiment of the present invention, the memory controller 104 further includes a power management circuit 254. The power management circuit 254 is coupled to the memory management circuit 202 and configured for controlling the power of the memory storage apparatus 100.

In one exemplary embodiment of the present invention, the memory controller 104 further includes an error checking and correcting circuit 256. The error checking and correcting circuit 256 is coupled to the memory management circuit 202 and configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the rewritable non-volatile memory module 106. Subsequently, when the memory management circuit 202 reads the data from the rewritable non-volatile memory module 106, the memory management circuit 202 simultaneously reads the ECC code corresponding to the data, and the error checking and correcting circuit 256 executes the ECC procedure on the read data according to the corresponding ECC code.

Figure 4A:
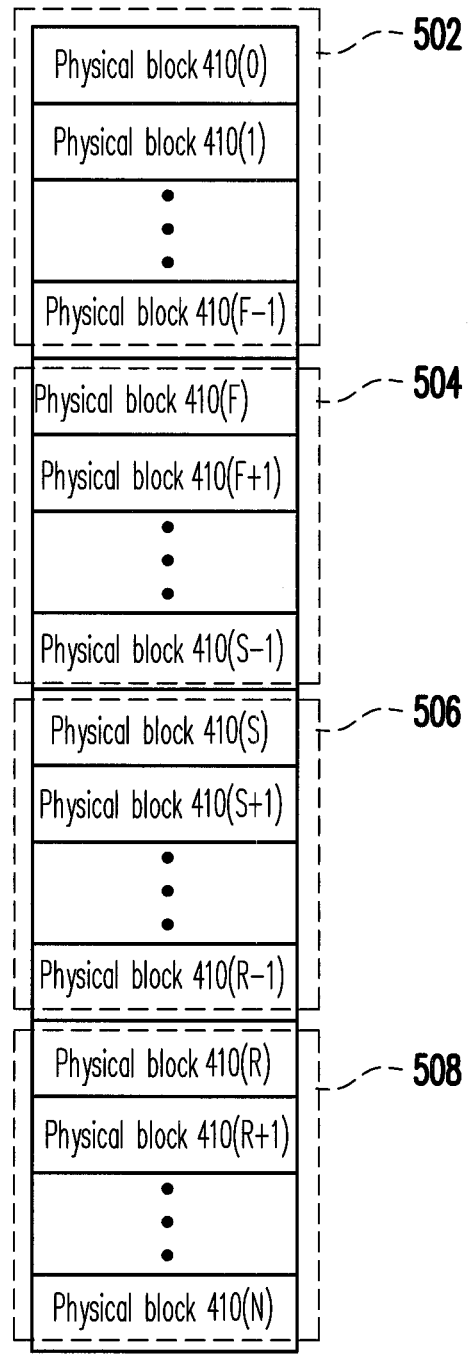
FIG. 4A and FIG. 4B are schematic diagrams of managing physical blocks according to an exemplary embodiment of the present invention.
Figure 4B:
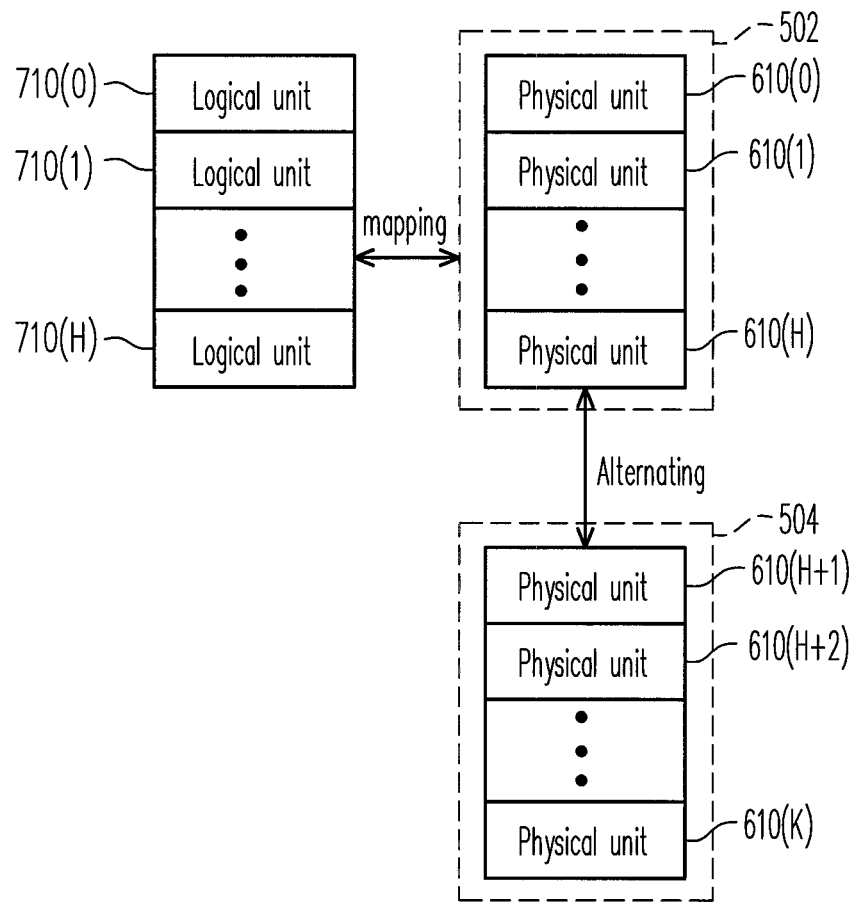

FIGS. 4A and 4B are schematic diagrams of managing physical blocks according to an exemplary embodiment of the present invention.

Referring to FIG. 4A, the memory management circuit 202 of the memory controller 104 logically groups the physical blocks 410(0)~410(N) into a data area 502, a free area 504, a system area 506, and a replacement area 508.

Logically, the physical blocks of the data area 502 and the free area 504 are used for storing data from the host system 1000. To be specific, the physical blocks of the data area 502 are physical blocks which have been used to store data, and the physical blocks of the free area 504 are physical blocks which are used to substitute the physical blocks in the data area 502. In other words, when the host system 1000 receives a write command and data to be written, the memory management unit 202 gets a physical block from the free area 504 and writes the data into the gotten physical block to substitute the physical block in the data area 502.

The physical blocks logically belonging to the system area 506 are used for recording system data. For example, system data includes manufacturers and product model number of the rewriteable non-volatile memory module, the number of physical blocks in the rewritable non-volatile memory module, the number of physical pages of each physical block, etc. . . .

The physical blocks logically belonging to the replacement area 508 are used for a damaged physical block replacement procedure to replace damaged physical blocks. Specifically, if there are still normal physical blocks in the replacement area 508 and a physical block in the data area 502 is damaged, the memory management circuit 202 gets a normal physical block from the replacement area 508 to replace the damaged physical block (also referred to as "bad physical block").

Referring to FIG. 4B, the memory management circuit 202 groups the physical blocks 410-(0)~410-(S−1) of the data area 502 and the free area 504 into physical units 610(0)~610 (K) and manages the physical blocks in units of each physical unit. In the present exemplary embodiment, each physical unit comprises one physical block. However, it should be understood that the present invention is not limited thereto. In another exemplary embodiment, each physical unit may also be composed of at least two physical blocks belonging to the same memory sub-module or belonging to different memory sub-modules.

Furthermore, the memory management circuit 202 configures logical units 710(0)~710(H) to map to the physical units in the data area 502, wherein each of the logical units has a plurality of logical pages to sequentially map to physical pages of the physical units. In the exemplary embodiment, each physical unit comprises one physical block, and each logical page maps to one physical page (i.e. the capacity of each logical page is the capacity of one physical page). However, in the example, wherein each physical unit comprises a plurality of physical blocks, each logical page may also map to a plurality of physical pages (i.e. the capacity of each logical page is the capacity of a plurality of physical pages).

In the exemplary embodiment, the memory management unit 202 maintains a logical unit-physical unit mapping table to record the mapping relationship between the logical units 710(0)~710(H) and the physical units in the data area 502. For example, when the host system 1000 is about to access a certain logical access address, the memory management circuit 202 converts the logical access address to be accessed by the host system 1000 into an address comprising corresponding logical unit, logical page, and logical sector and accesses data in the corresponding physical page of the physical unit through the logical unit-physical unit mapping table.

In the present exemplary embodiment, the memory management circuit 202 gets a physical unit in the free area 504 to be a global random physical unit and writes data (also referred to as "updated data") contained in the write command from the host system 1000 into the global random physical unit. In the present exemplary embodiment, the global random physical unit is a unit used for storing data corresponding to different logical units in at least the same physical block.

Specifically, when the memory storage apparatus 100 receives the write command from the host system 1000, data contained in the write command from the host system 1000 is sequentially written into the global random physical unit. Furthermore, when the global random physical unit is full with data, the memory management circuit 202 gets a physical cal unit in the free area 504 to be another global random physical unit for continuously writing the updated data from the host system 1000. In particular, when the number of physical units as global random physical units reaches an upper limit, the memory management circuit 202 executes a data merging procedure and then associates the global random physical units storing all invalid data therein with the free area 504.

FIGS. 5A-5G are schematic diagrams of writing data according to one exemplary embodiment of the present invention.

For the purpose of illustration, it is assumed that the data area 502 has 5 physical units, the free area 504 has 4 physical units, each physical unit has 3 physical pages, data to be written into each physical unit has to be written according to a sequence of the physical pages, and the upper limit of the number of physical units as global random physical units is 3.

Figure 5A:
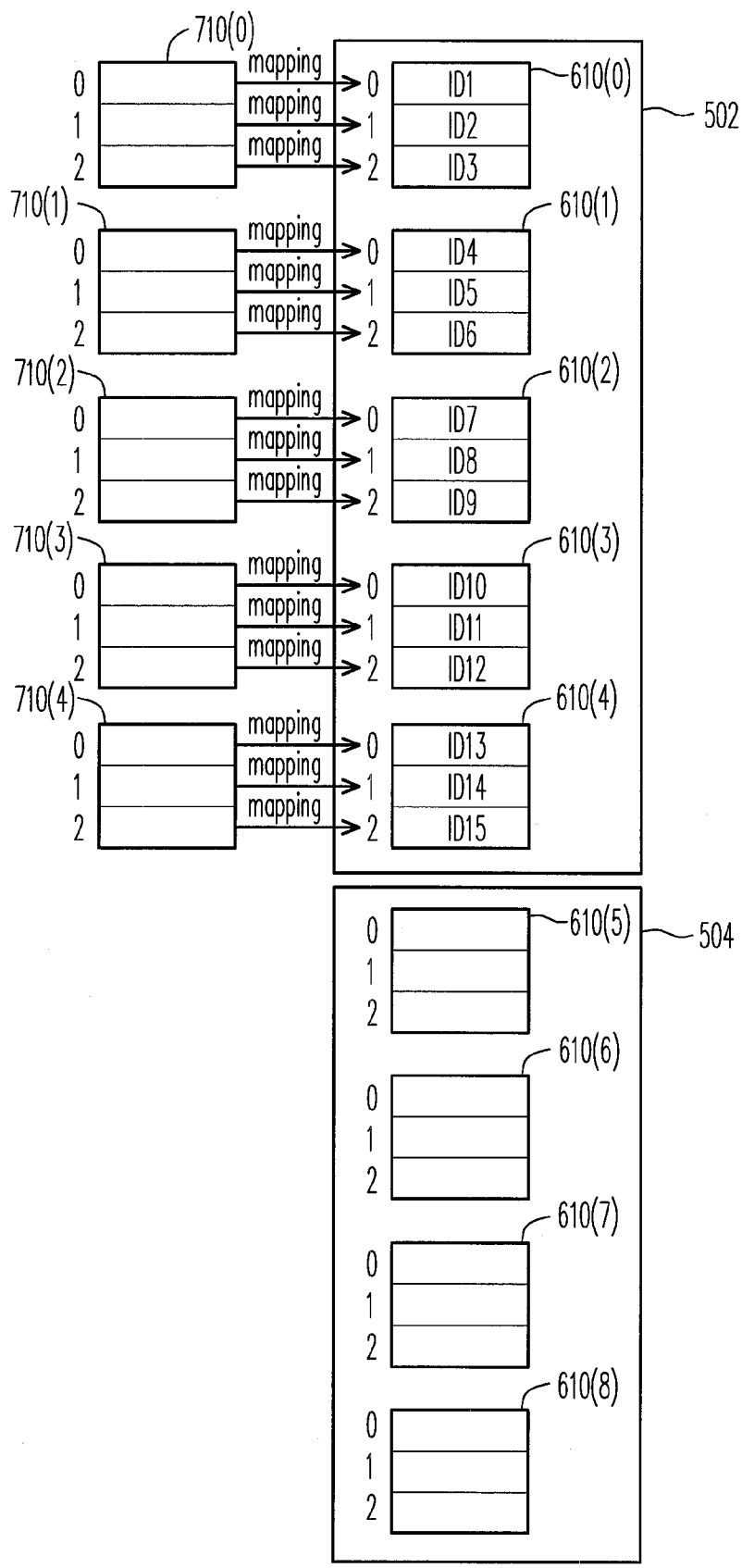
FIG. 5A-5G are example schematic diagrams of writing data according to an exemplary embodiment of the present invention.

Referring to FIG. 5A, in an initial state of the memory storage apparatus 100, the logical pages of the logical units 710(0)~710(4) map to the physical pages of the physical units 610(0)~610(4) of the data area 502, and the free area 504 has the physical units 610(5)~610(8). In other words, the memory management circuit 202 records the mapping relationship between the logical units 710(0)~710(4) and the physical units 610(0)~610(4), and considers that the physical pages of the physical units 610(0)~610(4) have already stored data belonging to the logical pages of the logical units 710(0)~710 (4) (i.e. initial data ID1~ID15). It should be understood that when the memory storage apparatus 100 is first manufactured, the initial data ID1~ID15 may be null. Furthermore, the memory management circuit 202 records the physical units 610(5)~610(8) that is available in the free area 504.

Figure 5B:
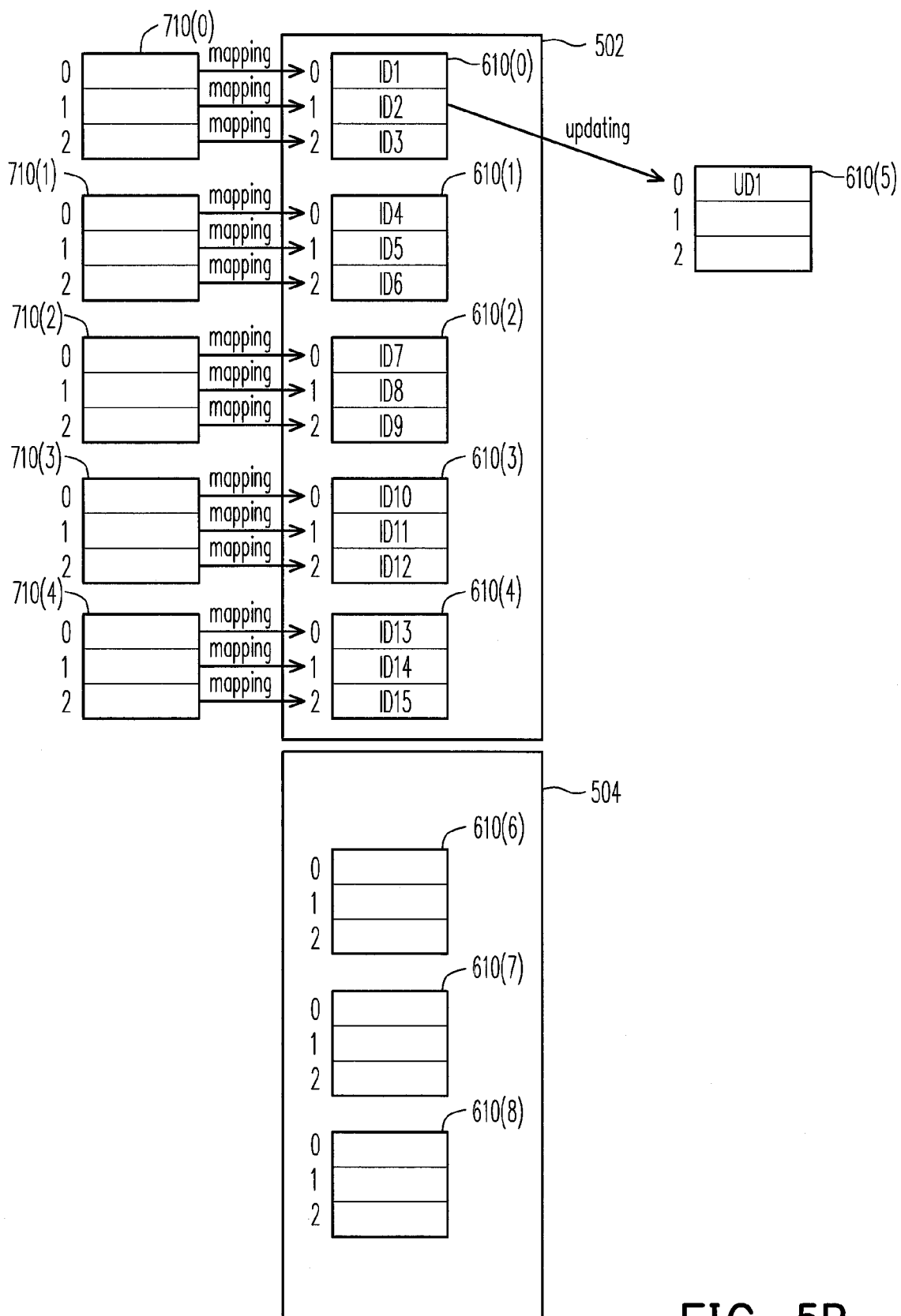

Referring to FIG. 5B, when updated data UD1 is to be programmed and the updated data UD1 belongs to the $1^{st}$ logical page of the logical unit 710(0), the memory management circuit 202 gets the physical unit 610(5) to be a global random physical unit and gives a program command to write the updated data UD1 into the $0^{th}$ physical page of the physical cal unit 610(5).

Figure 5C:
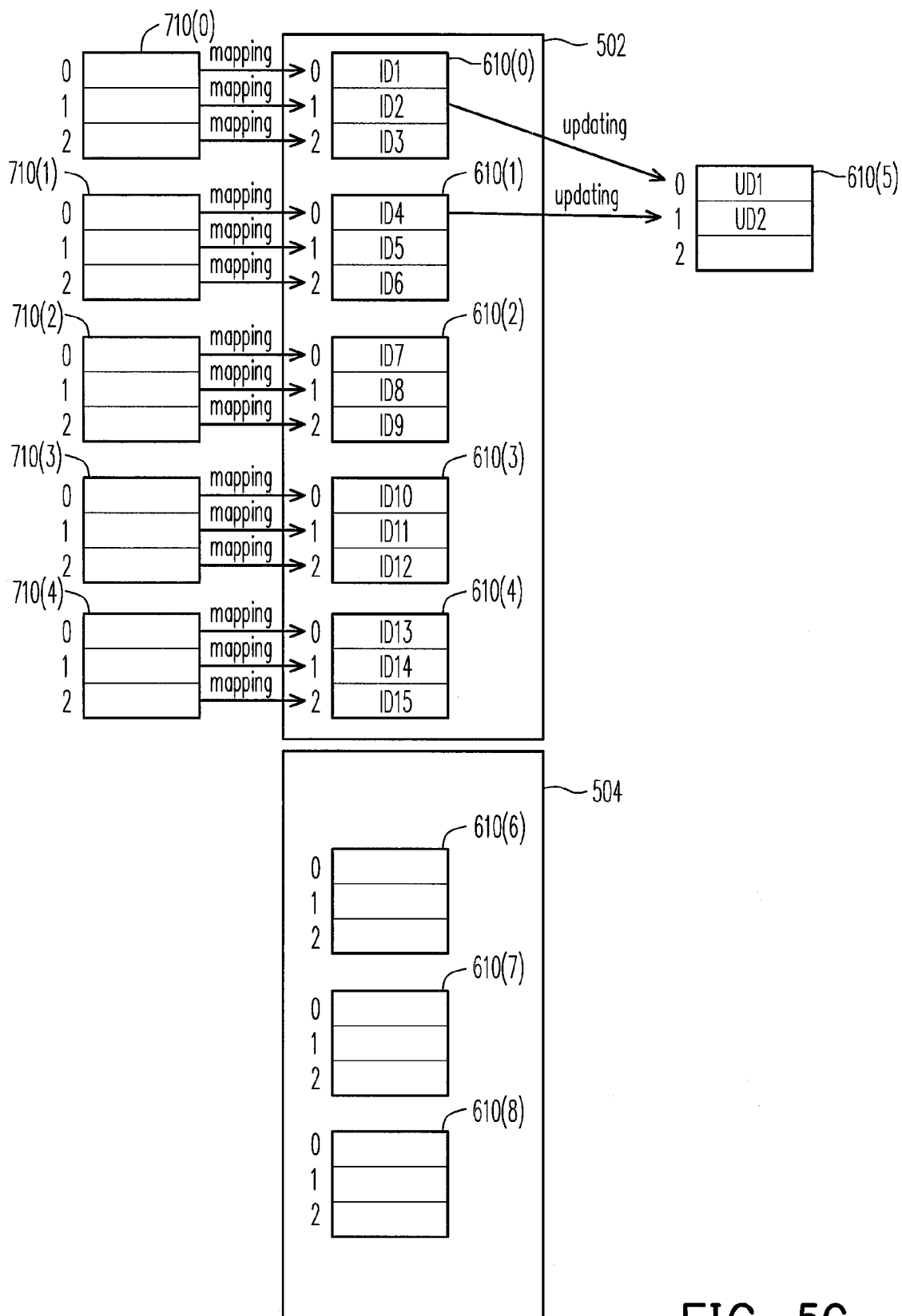

Referring to FIG. 5C, continuing from FIG. 5B, when updated data UD2 is to be programmed and the updated data UD2 belongs to the $0^{th}$ logical page of the logical unit 710(1), the memory management circuit 202 gives a program command to write the updated data UD2 into the $1^{st}$ physical page of the physical unit 610(5).

Figure 5D:
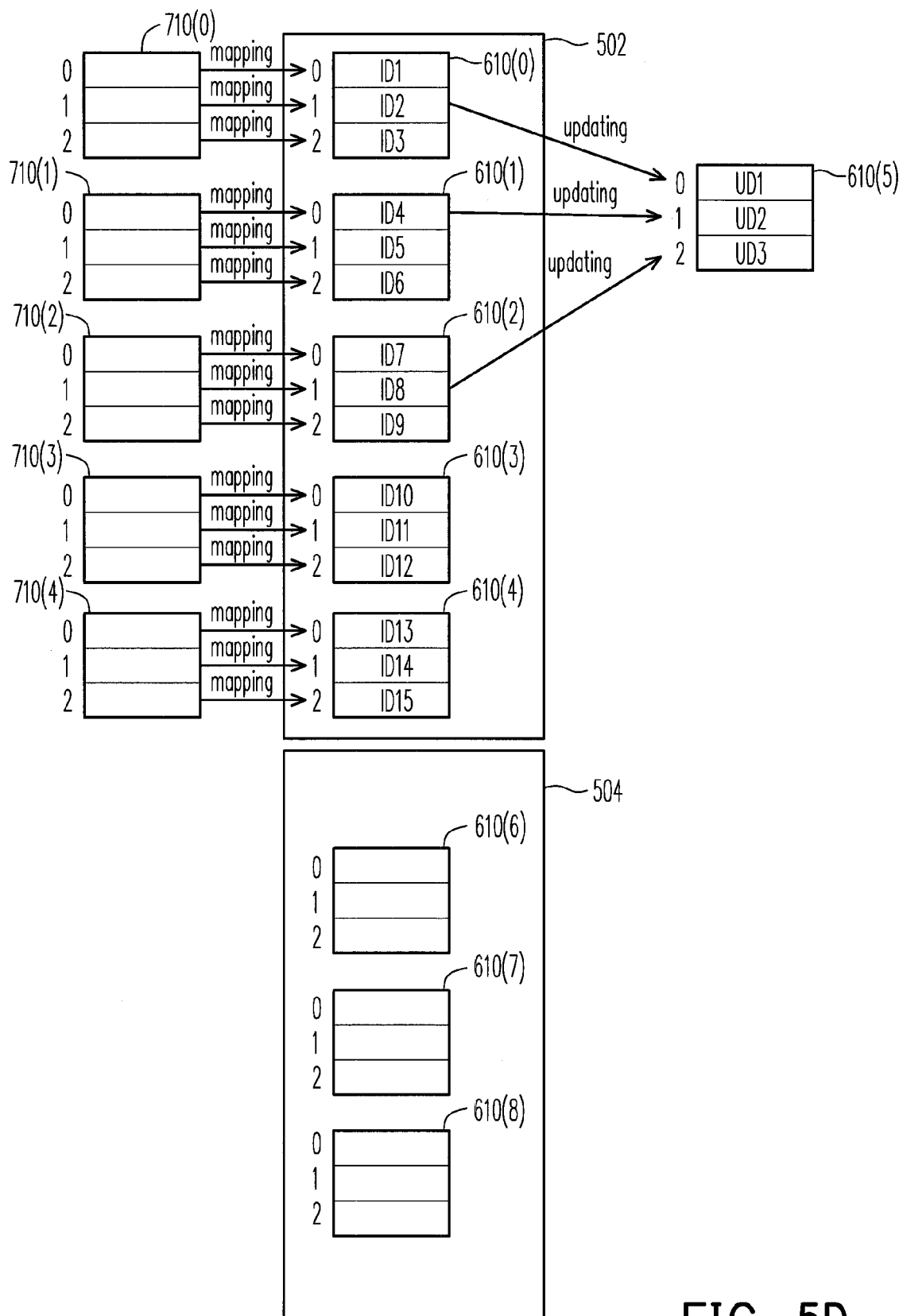

Referring to FIG. 5D, continuing from FIG. 5C, when updated data UD3 is to be programmed and the updated data UD3 belongs to the $1^{st}$ logical page of the logical unit 710(2), the memory management circuit 202 gives a program command to write the updated data UD3 into the $2^{nd}$ physical page of the physical unit 610(5).

Figure 5E:
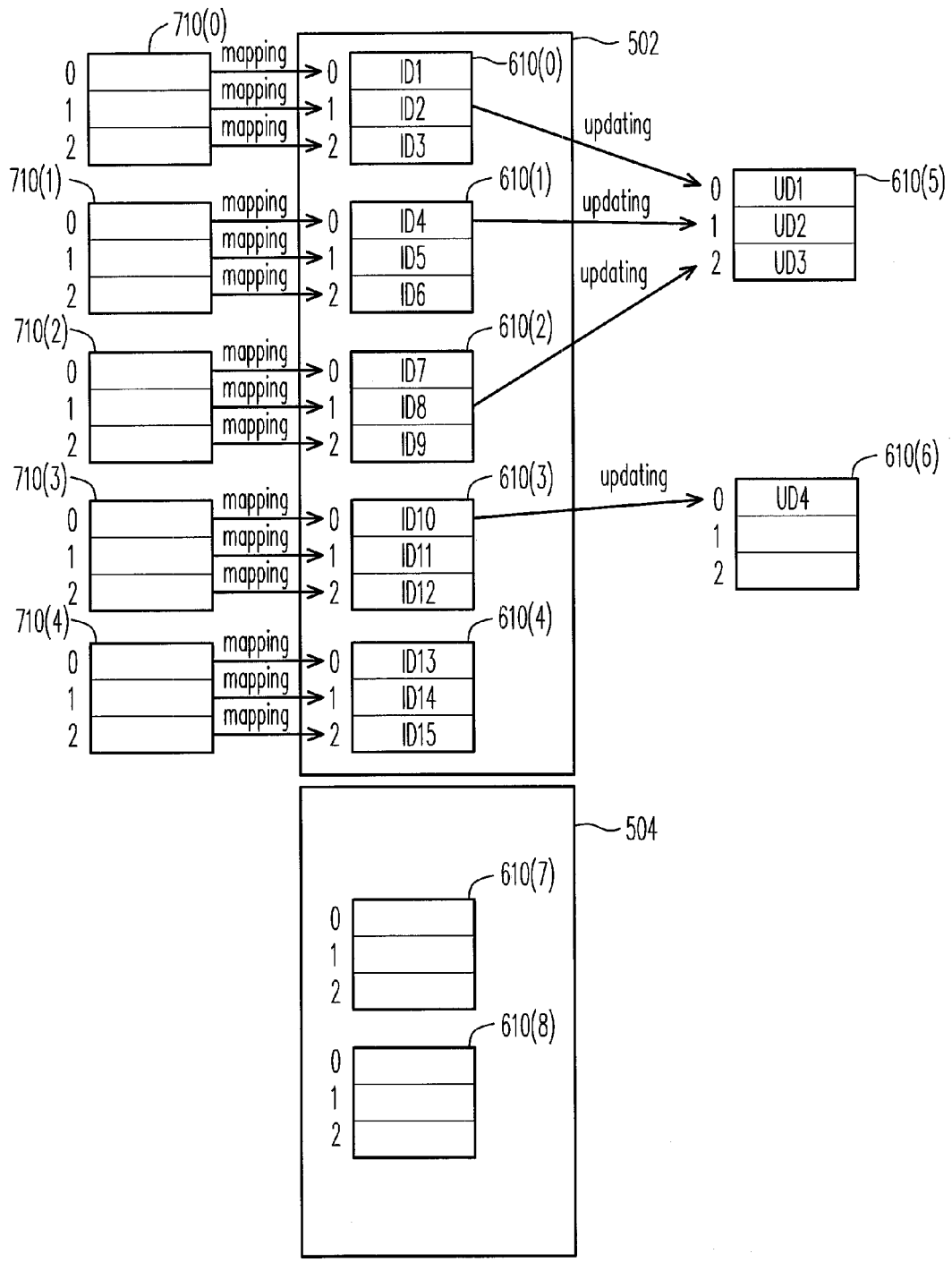

Referring to FIG. 5E, continuing from FIG. 5D, when updated data UD4 is to be programmed and the updated data UD4 belongs to the $0^{th}$ logical page of the logical unit 710(3), since the global random physical unit 610(5) has no storage space, the memory management circuit 202 gets the physical unit 610(6) to be a new global random physical unit and gives a program command to write the updated data UD4 into the $0^{th}$ physical page of the physical unit 610(6).

Figure 5F:
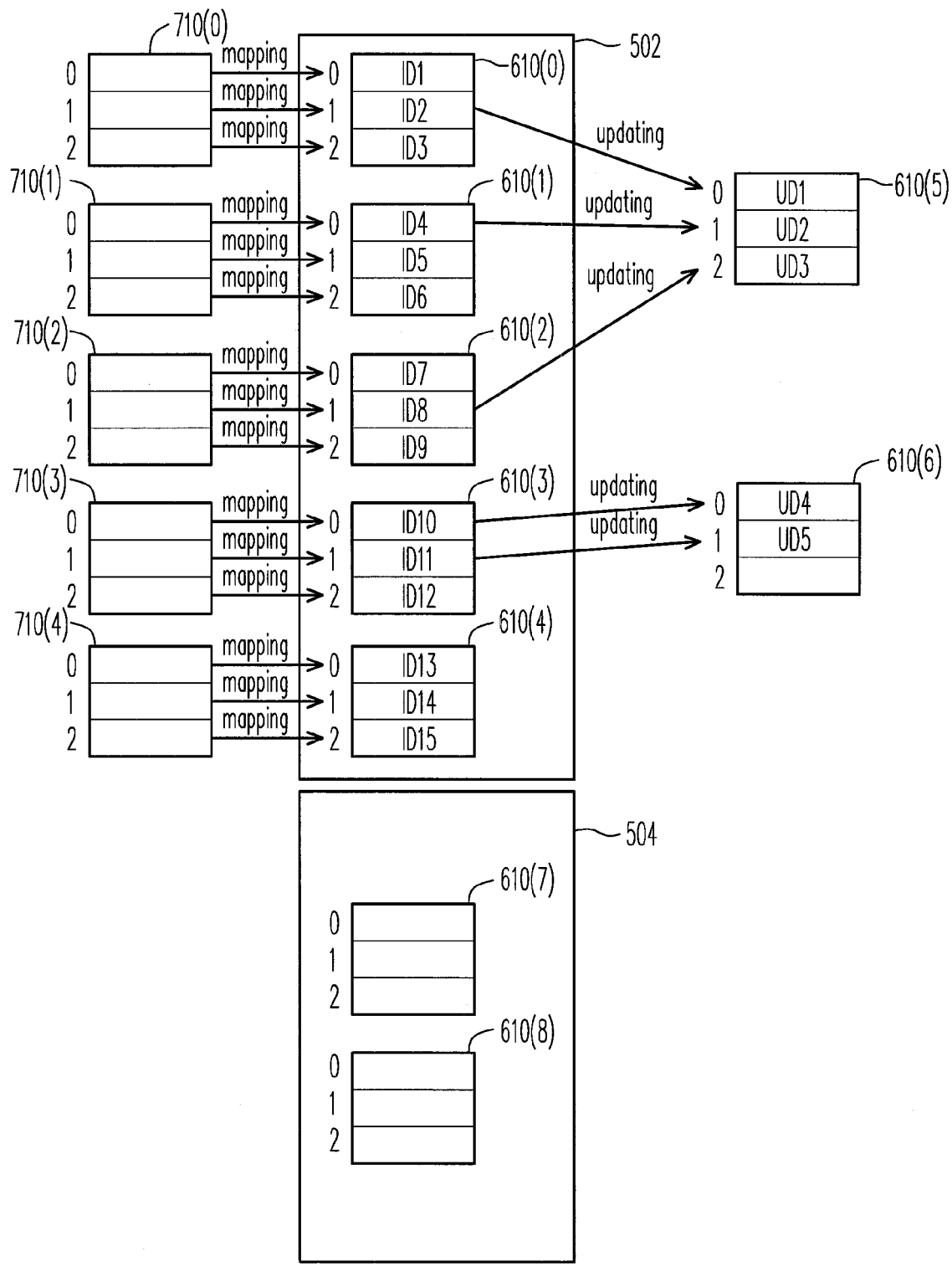

Referring to FIG. 5F, continuing from FIG. 5E, when updated data UD5 is to be programmed and the updated data UD5 belongs to the $1^{st}$ logical page of the logical unit 710(3), the memory management circuit 202 gives a program command to write the updated data UD5 into the $1^{st}$ physical page of the physical unit 610(6).

Figure 5G:
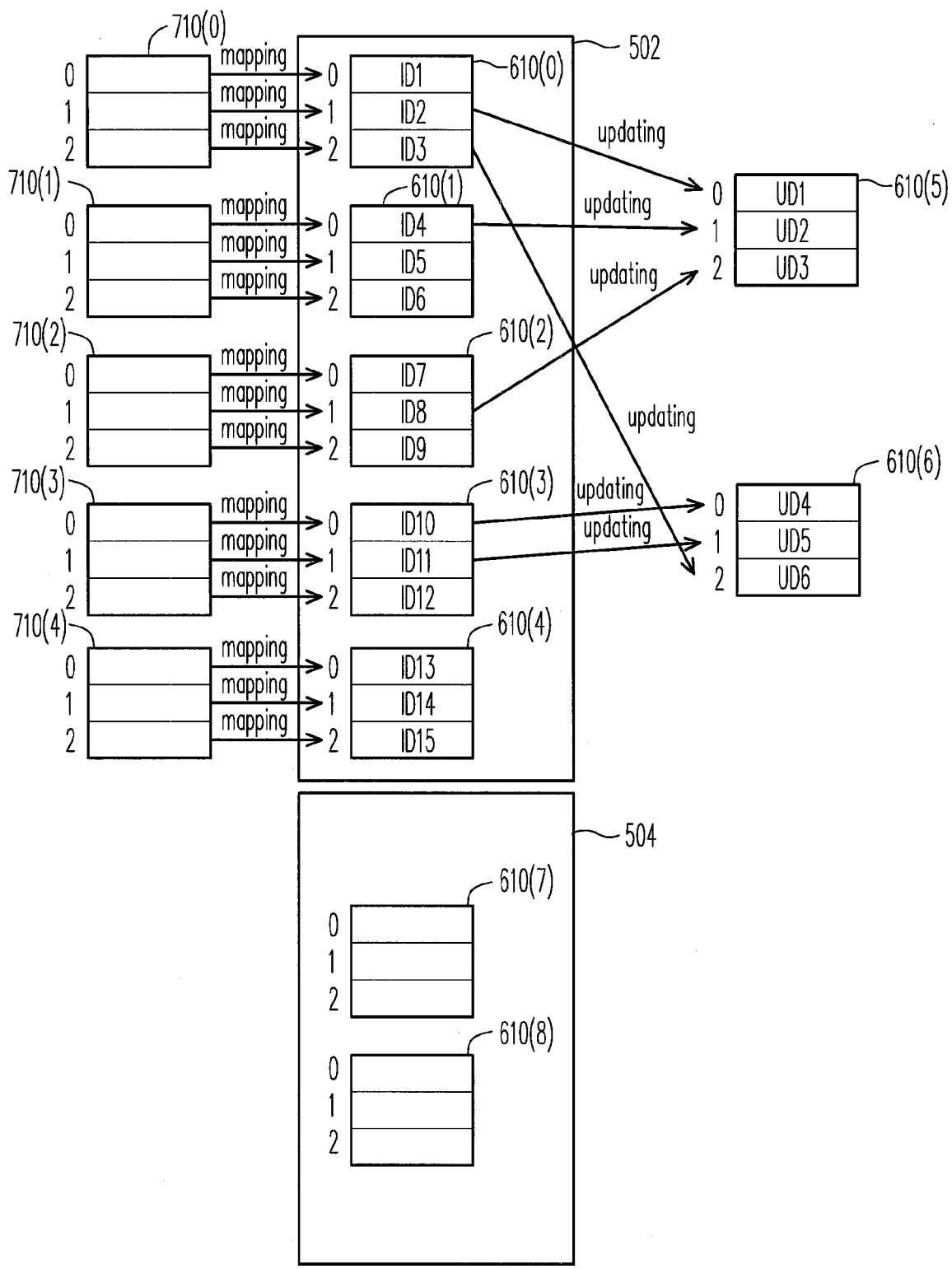

Referring to FIG. 5G, continuing from FIG. 5F, when updated data UD6 is to be programmed and the updated data UD6 belongs to the $2^{nd}$ logical page of the logical unit 710(0), the memory management circuit 202 gives a program command to write the updated data UD6 into the $2^{nd}$ physical page of the physical unit 610(6).

To be able to identify to which logical page the data in the global random physical unit belongs, in the present exemplary embodiment, the memory management circuit 202 establishes a global random physical unit search table to effectively look up valid data. In the global random physical unit search table, the memory management circuit 202 builds a plurality of root units, and each of the root units is configured with an entry link. In particular, the memory management circuit 202 groups the logical pages of the logical units to respectively correspond to one of the root units, and records updated information of the logical page on the entry link of the corresponding root unit. Based on this, when updated data of a certain logical unit is to be searched in the global random physical unit, it is only required to search for the entry link of the corresponding root unit.

For example, in the present exemplary embodiment, the memory management circuit 202 corresponds logical pages of each logical unit respectively to the same root unit. That is, logical pages of the same logical unit correspond to a same root unit. It should be understood that the present invention is not limited thereto. For example, in another exemplary embodiment of the present invention, some of the logical pages of a logical unit may be grouped to correspond to a root unit, and the other logical pages of the logical unit may be grouped to correspond to another root unit.

In addition, the memory management circuit 202 configures an entry link respectively for each root unit, and each time when a write command is executed, the memory management circuit 202 establishes an entry on the corresponding entry link to record updated information about the write command. For example, each entry includes a first column (e.g. column 902 of FIG. 6) and a second column (e.g. column 904 of FIG. 6), wherein the first column records an address of an updated logical page and the second column records a physical address storing the updated data of the updated logical page.

Figure 6:
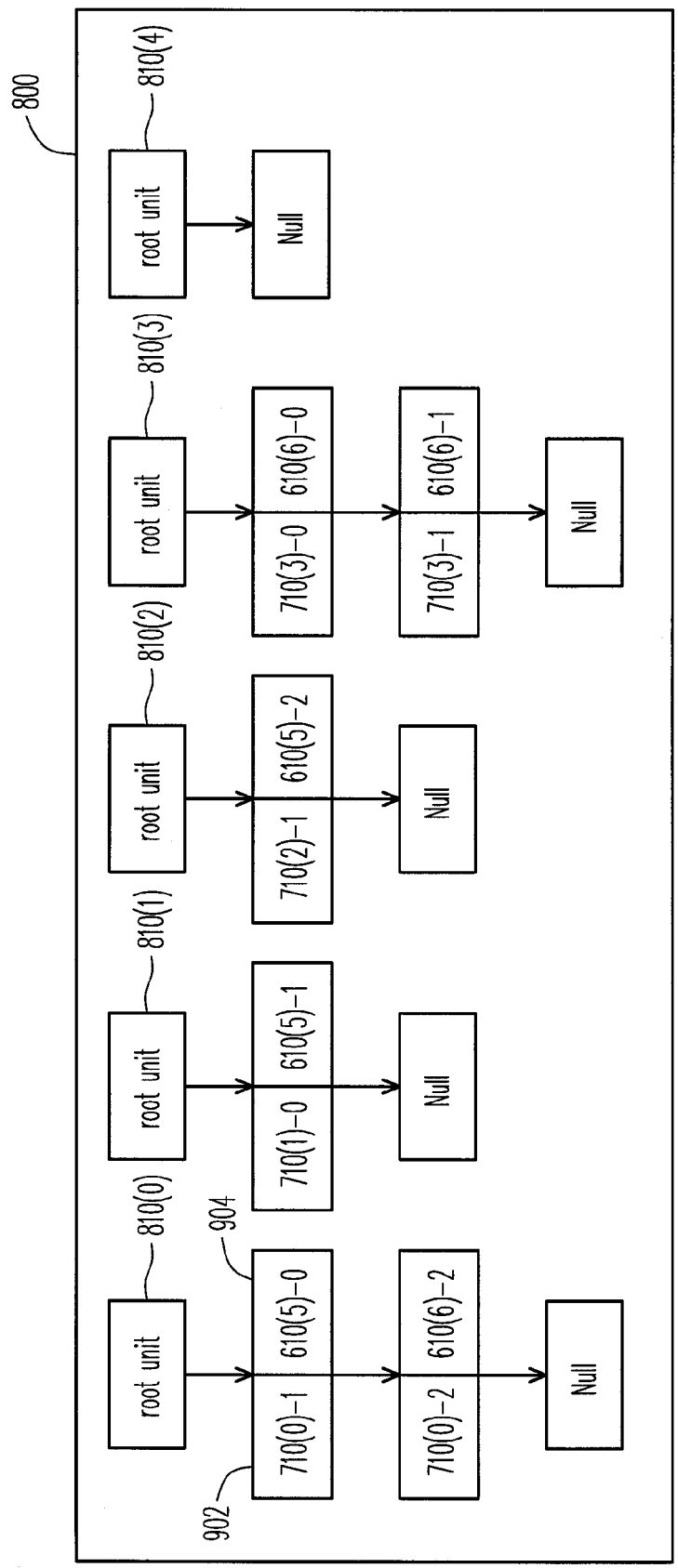
FIG. 6 illustrates a global random physical unit search table according to FIG. 5G.

FIG. 6 illustrates the global random physical unit search table according to FIG. 5G.

Referring to FIG. 6, a global random physical unit search table 800 includes root units 810(0)~810(4), wherein the logical pages of the logical unit 710(0) correspond to the root unit 810(0), the logical pages of the logical unit 710(1) correspond to the root unit 810(1), the logical pages of the logical unit 710(2) correspond to the root unit 810(2), the logical pages of the logical unit 710(3) correspond to the root unit 810(3), and the logical pages of the logical unit 710(4) correspond to the root unit 810(4).

The entry link of the root unit 810(0) include two valid entries to record that the $1^{st}$ logical page (i.e. information 710(0)-1) and the $2^{nd}$ logical page (i.e. information 710(0)-2) of the logical unit 710(0) have been updated, wherein the updated data of the $1^{st}$ logical page of the logical unit 710(0) is written to the $0^{th}$ physical page of the physical unit 610(5) (i.e. information 610(5)-0), and the updated data of the $2^{nd}$ logical page of the logical unit 710(0) is written to the $2^{nd}$ physical page of the physical unit 610(6) (i.e. information 610(6)-2).

The entry link of the root unit 810(1) include one valid entry to record that the $0^{th}$ logical page of the logical unit 710(1) (i.e. information 710(1)-0) has been updated, wherein the updated data of the $0^{th}$ logical page of the logical unit 710(1) is written to the $1^{st}$ physical page of the physical unit 610(5) (i.e. information 610(5)-1).

The entry link of the root unit 810(2) include one valid entry to record that the $1^{st}$ logical page of the logical unit 710(2) (i.e. information 710(2)-1) has been updated, wherein the updated data of the $1^{st}$ logical page of the logical unit 710(2) is written to the $2^{nd}$ physical page of the physical unit 610(5) (i.e. information 610(5)-2).

The entry link of the root unit 810(3) include two valid entries to record that the $0^{th}$ logical page (i.e. information 710(3)-0) and the $1^{st}$ logical page (i.e. information 710(3)-1) of the logical unit 710(3) have been updated, wherein the updated data of the $0^{th}$ logical page of the logical unit 710(3) is written to the $0^{th}$ physical page of the physical unit 610(6) (i.e. information 610(6)-0), and the updated data of the $1^{st}$ logical page of the logical unit 710(3) is written to the $1^{st}$ physical page of the physical unit 610(6) (i.e. information 610(6)-1).

In addition, the entry links of the root units 810(0)~810(4) respectively include one blank entry (also called null entry) to indicate the end of the entry link. For example, if it is wished to search the global random physical unit for data belonging to the logical unit 710(4), the memory management circuit 202 can identify that the global random physical unit does not store data belonging to the logical unit 710(4) based on the fact that entry link of the root unit 810(4) only have one blank entry and thereby directly reads data from the physical page of the corresponding physical unit according to information in the logical unit-physical unit mapping table.

It can be deduced that the memory management circuit 202 writes the data to be stored by the host system 1000 sequentially into the physical unit which is to be the global random physical unit. In particular, when the number of the physical units as global random physical units reaches 3, the memory management circuit 202 performs a data merging procedure when executing the write command to prevent the physical units in the free area from being exhausted.

Figure 7A:
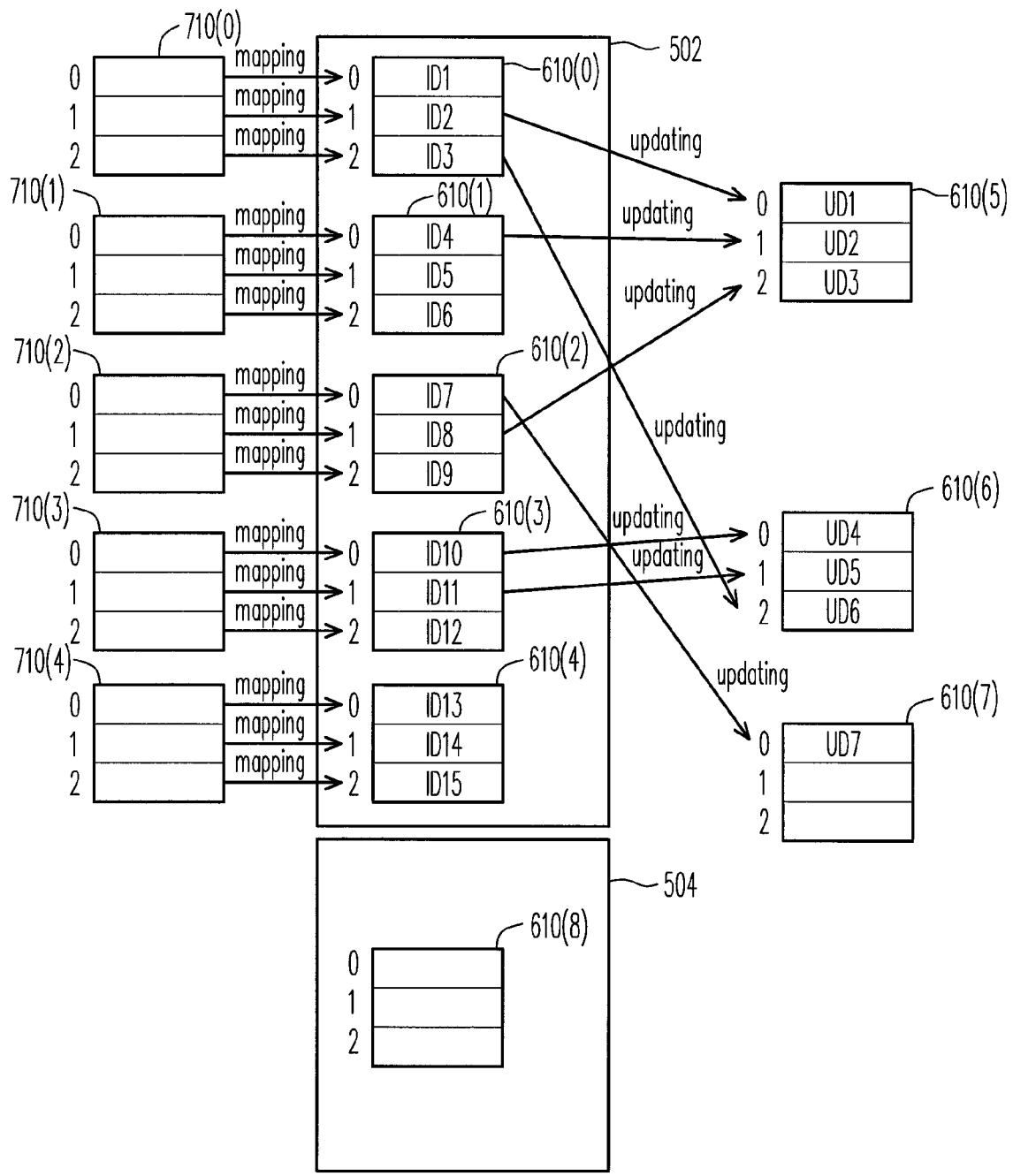
FIG. 7A and FIG. 7B are example schematic diagrams of writing data and executing a data merging procedure according to an exemplary embodiment of the present invention.
Figure 7B:
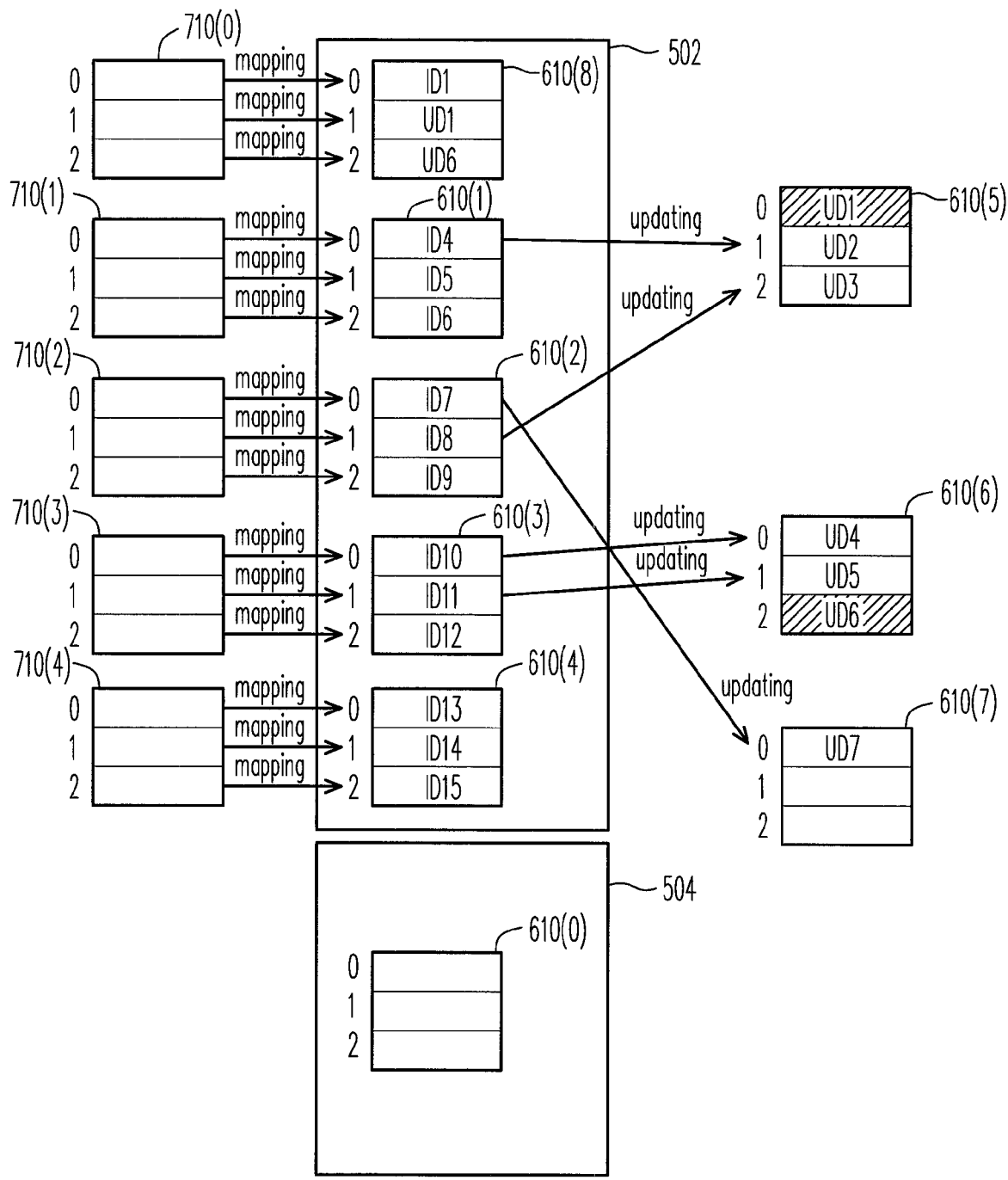

FIGS. 7A and 7B are schematic diagrams of writing data and executing a data merging procedure according to one exemplary embodiment of the present invention.

Referring to FIG. 7A, continuing from FIG. 5G, when updated data UD7 is to be programmed and the updated data UD7 belongs to the $0^{th}$ logical page of the logical unit 710(2), since the global random physical unit 610(6) has no storage space, the memory management circuit 202 gets the physical unit 610(7) from the free area 504 to be a global random physical unit and gives a program command to write the updated data UD7 into the $0^{th}$ physical page of the physical unit 610(7). In particular, because the number of the physical units as global random physical units has reached 3, the memory management circuit 202 performs a data merging procedure after executing the write operation as shown in FIG. 7B. In other words, in this example, during the execution of the write command, the memory management circuit 202 performs the data merging procedure.

Referring to FIG. 7B, when the memory management circuit 202 selects the logical unit 710(0) to perform the data merging procedure, the memory management circuit 202 identifies that the logical unit 710(0) maps to the physical unit 610(0), gets the physical unit 610(8) from the free area 504, and copies the valid data belonging to the logical unit 710(0) to the physical unit 610(8) from the global random physical unit and the physical unit 610(0). To be specific, the memory management circuit 202 sequentially writes the data ID1 in the physical unit 610(0), UD1 in the physical unit 610(5), and UD6 in the physical unit 610(6) into the $0^{th}$~$2^{nd}$ physical pages of the physical unit 610(8), and marks the $1^{st}$ physical page of the physical unit 610(5) and the $2^{nd}$ physical page of the physical unit 610(6) as invalid (as shown in shadowed area). Then, the memory management circuit 202 performs an erase operation on the physical unit 610(0), re-maps the logical unit 710(0) to the physical unit 610(8) in the logical unit-physical unit mapping table, and associates the physical unit 610(0) with the free area 504.

For example, when executing a next write command, the memory management circuit 202 performs the data merging procedure on the logical unit 710(1), and then when executing a subsequent write command, the memory management circuit 202 performs the data merging procedure on the logical unit 710(2). Therefore, when the storage space in the physical unit 610(7) is filled, all the data in the physical unit 610(5) will become invalid data. Accordingly, the memory management circuit 202 performs an erase operation on the physical unit 610(5) and associates the erased physical unit 610(5) with the free area 504.

Alternatively, for example, when executing a next write command, the memory management circuit 202 performs the data merging procedure on the logical unit 710(3). Therefore, before the storage space in the physical unit 610(7) is filled, all the data in the physical unit 610(6) will become invalid data. Accordingly, the memory management circuit 202 performs an erase operation on the physical unit 610(6) and associates the erased physical unit 610(6) with the free area 504.

According to the above operations, the memory management circuit 202 may continue associating physical units only storing invalid data with the free area 504 and getting physical units from the free area 504 to be global random physical units.

In the present exemplary embodiment, the memory management circuit 202 determines whether the updated data to be written by the host system 1000 is sequential data. Specifically, the data writing operation of the host system 1000 can be categorized as a sequential writing mode and a random writing mode. In the sequential writing mode, the host system 1000 sequentially writes pieces of data into a plurality of continuous logical pages. In the random writing mode, the host system 1000 writes data into non-continuous logical pages (for example, the first piece of updated data is first written into the fifth logical page, and then the second piece of updated data is written into the third logical page). Herein, the data written by the host system 1000 in the sequential writing mode is referred to as sequential data, and the data written by the host system in the random writing mode is referred to as random data.

In particular, when the updated data is sequential data, before writing each of the updated data into the physical page of the global random physical unit, the memory management circuit 202 determines, whether the logical page corresponding to the updated data to be written is a start logical page of any logical unit. Herein, the so-called start logical page refers to the $0^{th}$ logical page of a logical unit. In addition, when the logical page corresponding to the updated data to be written is a start logical page, the memory management circuit 202 gets a blank physical unit from the free area 504, writes the updated data into the $0^{th}$ physical page of the gotten physical unit, and sets the gotten physical unit as the current global random physical unit to write subsequent updated data. Herein, the so-called current global random physical unit is defined to mean the global random physical unit currently used to write the updated data from the host system 1000.

FIGS. 8A-8D are schematic diagrams of writing data stored by the host system in the sequential writing mode according to one exemplary embodiment of the present invention. In the present example, it is assumed that the current storage status is as shown in FIG. 5B and the host system 1000 sequentially writes updated data UD8, UD9, UD10, and UD11 into the second logical page of the logical unit 710(1) and the $0^{th}$ to $2^{nd}$ logical pages of the logical unit 710(2). In the exemplary embodiment, the memory management circuit 202 determines whether the updated data is sequential data according to the write command from the host system 1000. For example, a first flag is initially recorded in the buffer memory 252, wherein when the updated data is sequential data, the memory management circuit 202 marks the first flag as "1", and when the updated data is random data, the memory management circuit 202 un-marks the first flag as "0". However, it should be noted that the recording method of the first flag is not limited hereto. Any markings used to differentiate whether the host system 1000 stores data in the sequential writing mode are applicable in the present invention.

Thereafter, the memory management circuit 202 starts to write the updated data UD8, UD9, UD10, and UD11 into the physical page of the global random physical unit. In particular, when the first flag has been marked, the memory management circuit 202 determines whether the logical page corresponding to the updated data is a start logical page before writing the updated data.

Figure 8A:
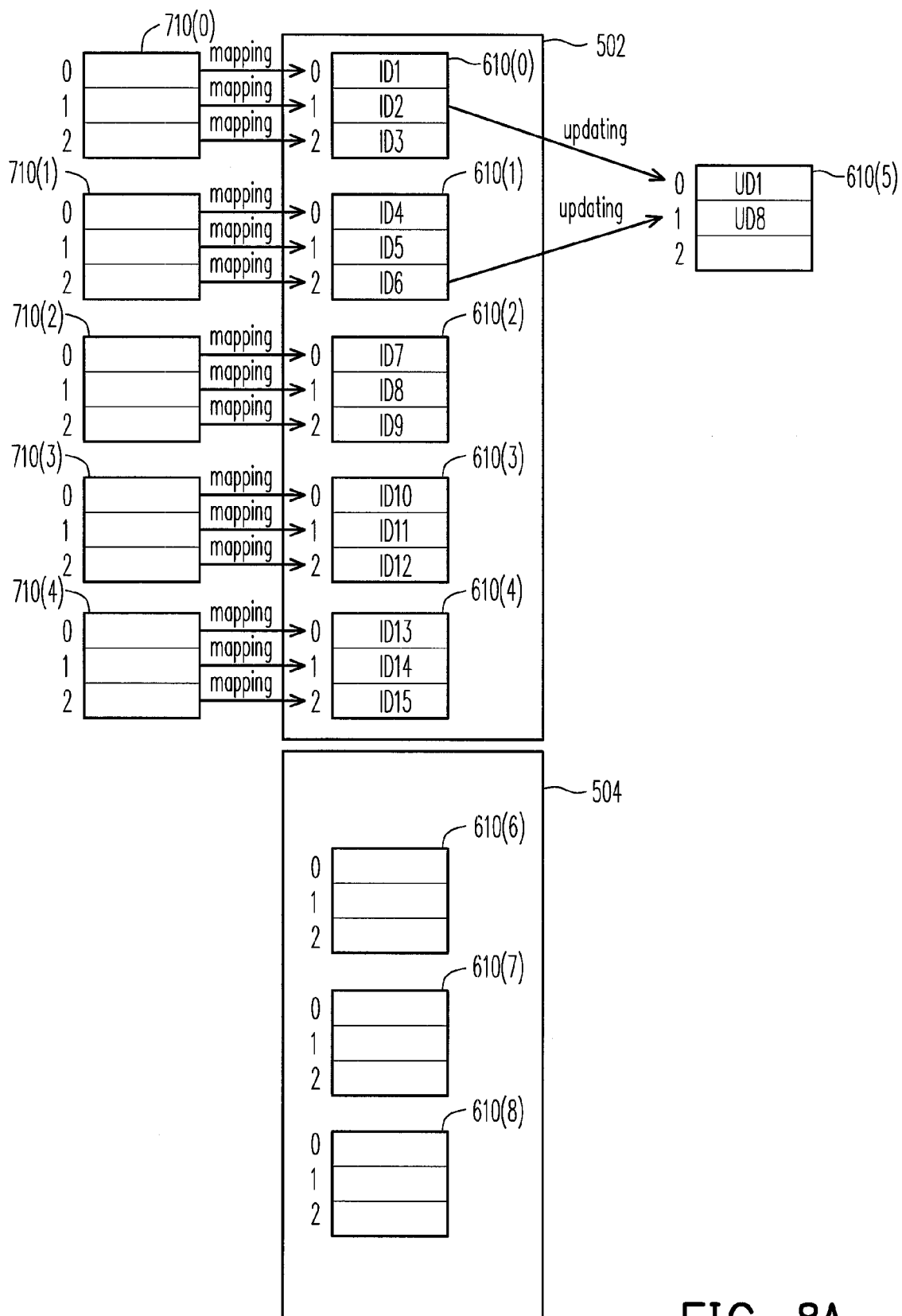
FIG. 8A-8D are schematic diagrams of writing data stored by a host system in a sequential writing mode according to an exemplary embodiment of the present invention.
Figure 9:
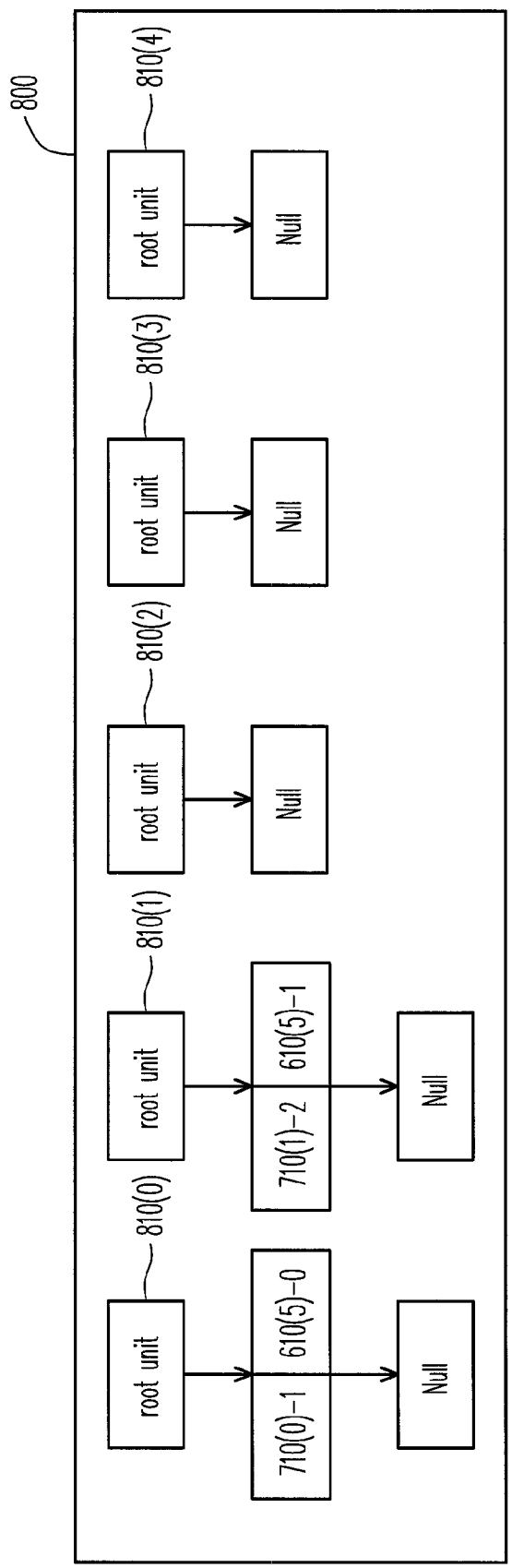
FIG. 9 illustrates a global random physical unit search table according to FIG. 8A.

First, referring to FIG. 8A, the memory management circuit 202 identifies that the logical page corresponding to the updated data UD8 is not a start logical page. At the time, the memory management circuit 202 sequentially writes the updated data UD8 into the physical page of the global random physical unit (i.e. the $1^{st}$ physical page of the physical unit 610(5)), and updates the global random physical unit search table 800 to record updated information of the $2^{nd}$ logical page of the corresponding logical unit 710(1) (as shown in FIG. 9). Herein, the physical unit as the current global random physical unit may also be referred to as a first global random physical unit.

Figure 8B:
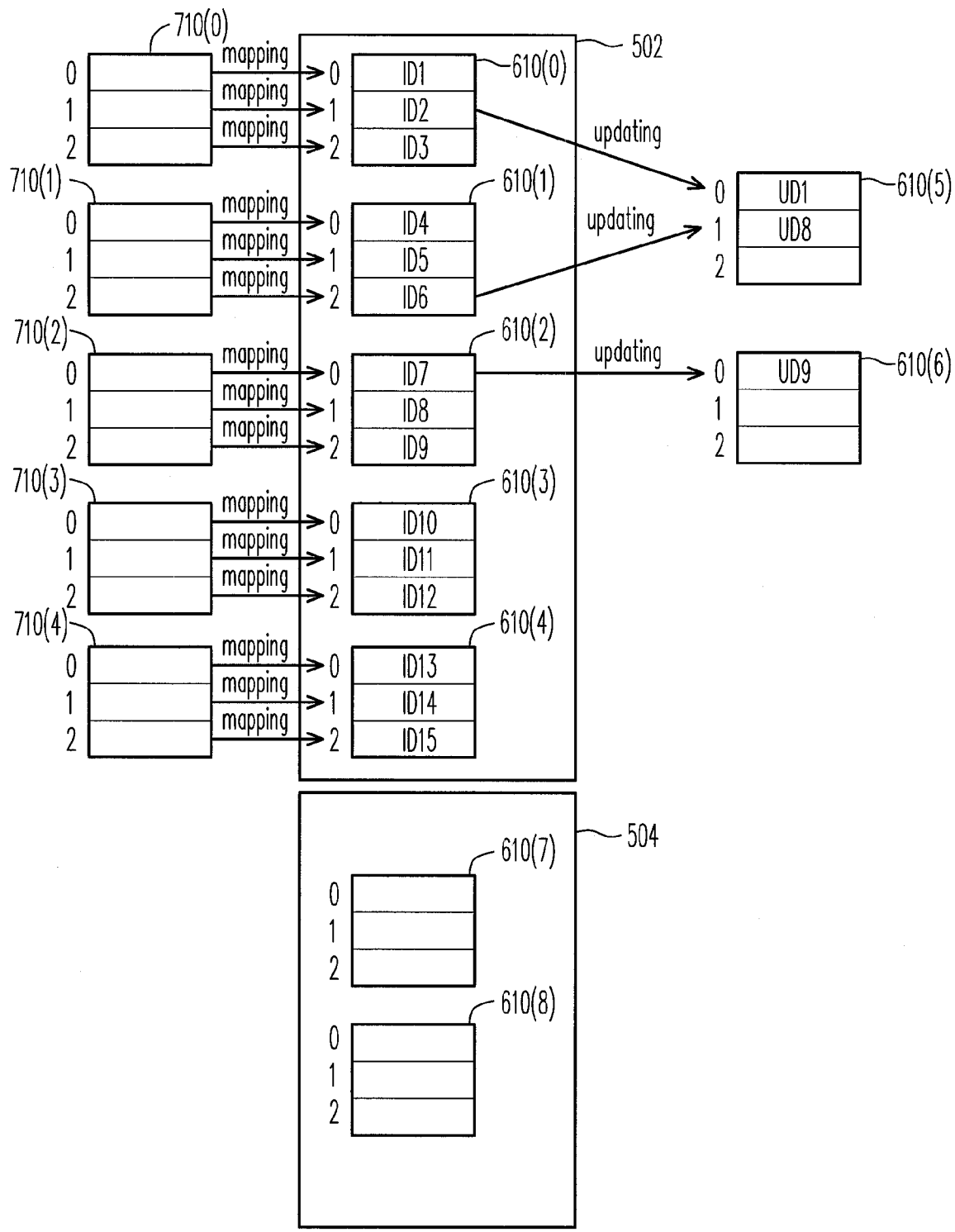

Then, referring to FIG. 8B, the memory management circuit 202 identifies that the logical page corresponding to the updated data UD9 is a start logical page. For example, a second flag is initially recorded in the buffer memory 252, wherein when the first flag is marked as "1" and the logical page corresponding to the updated data to be written is a start logical page, the memory management circuit 202 marks the second flag as "1" and when the first flag is un-marked as "0," the memory management circuit 202 also un-marks the second flag as "0". However, it should be noted that the recording method of the second flag is not limited hereto.

At this time, the memory management circuit 202 gets a blank physical unit 610(6) from the free area 504 to be the second global random physical unit, and sequentially writes the updated data UD9 into the $0^{th}$ physical page of the physical unit 610(6). Afterward, the memory management circuit 202 sets the second global random physical unit to be the current global random physical unit. In particular, the memory management circuit 202 does not update the global random physical unit search table 800. In other words, the updated information of the $0^{th}$ logical page of the logical unit 710(2) is not recorded in the global random physical unit search table 800. Specifically, the memory management circuit 202 determines whether to update the global random physical unit search table 800 according to the second flag, wherein when the second flag is marked as "1," the memory management circuit 202 does not update the global random physical unit search table 800, and when the second flag is un-marked as "0," the memory management circuit 202 updates the global random physical unit search table 800.

Figure 8C:
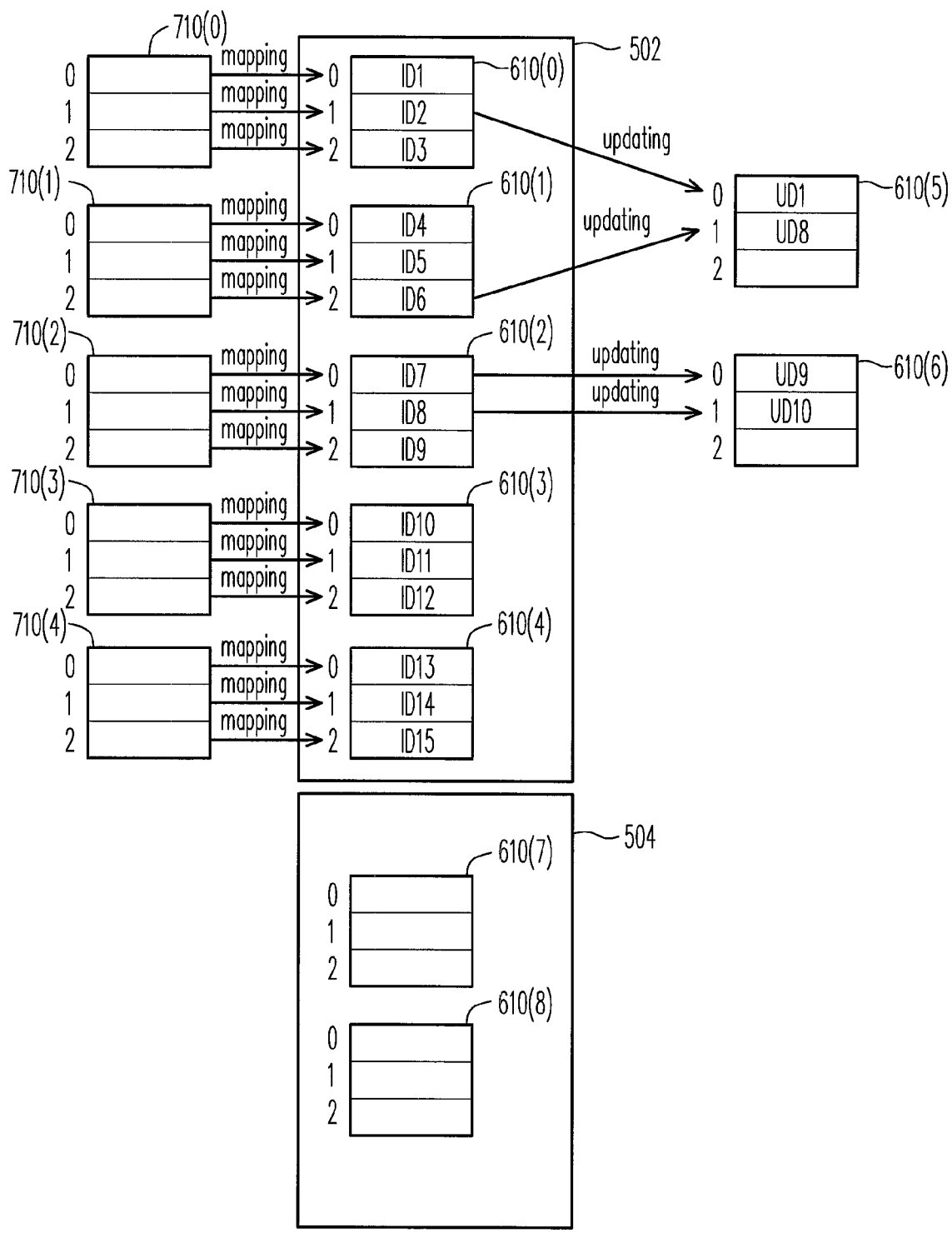

Then, referring to FIG. 8C, the memory management circuit 202 identifies that the logical page corresponding to the updated data UD10 is not a start logical page. At this time, the memory management unit 202 sequentially writes the updated data UD10 into the physical page of the current global random physical unit (i.e. the $1^{st}$ physical page of the physical unit 610(6)). Particularly, since the second flag is marked as "1," the memory management circuit 202 does not record the updated information of the $1^{st}$ logical page of the corresponding logical unit 710(2) in the global random physical unit search table 800.

Figure 8D:
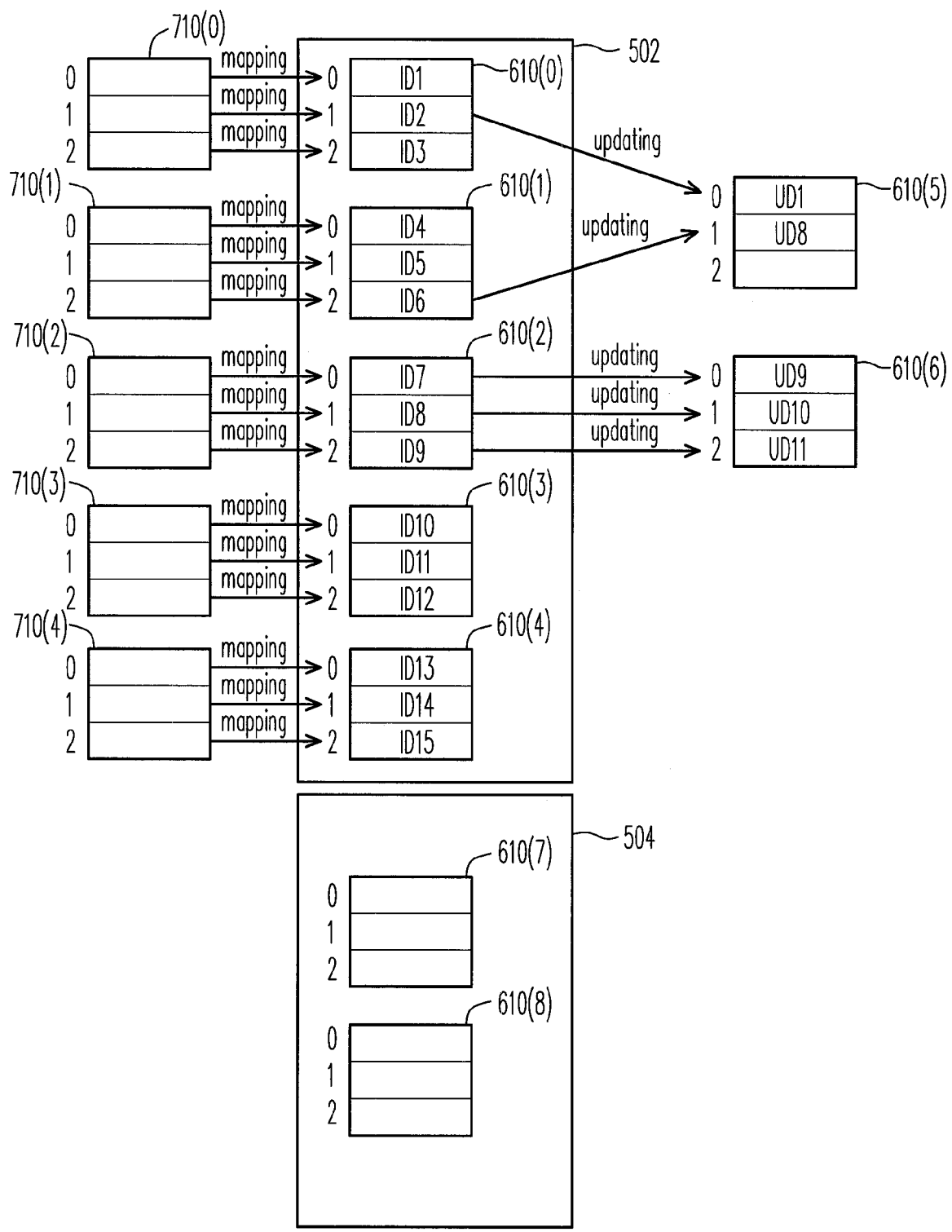

Then, referring to FIG. 8D, the memory management circuit 202 identifies that the logical page corresponding to the updated data UD11 is not a start logical page. At this time, the memory management circuit 202 sequentially writes the updated data UD11 into the physical page of the current global random physical unit (i.e. the $2^{nd}$ physical page of the physical unit 610(6)). Particularly, since the second flag has been marked as "1," the memory management circuit does not record the updated information of the $2^{nd}$ logical page of the corresponding logical unit 710(2) in the global random physical unit search table 800.

Figure 10:
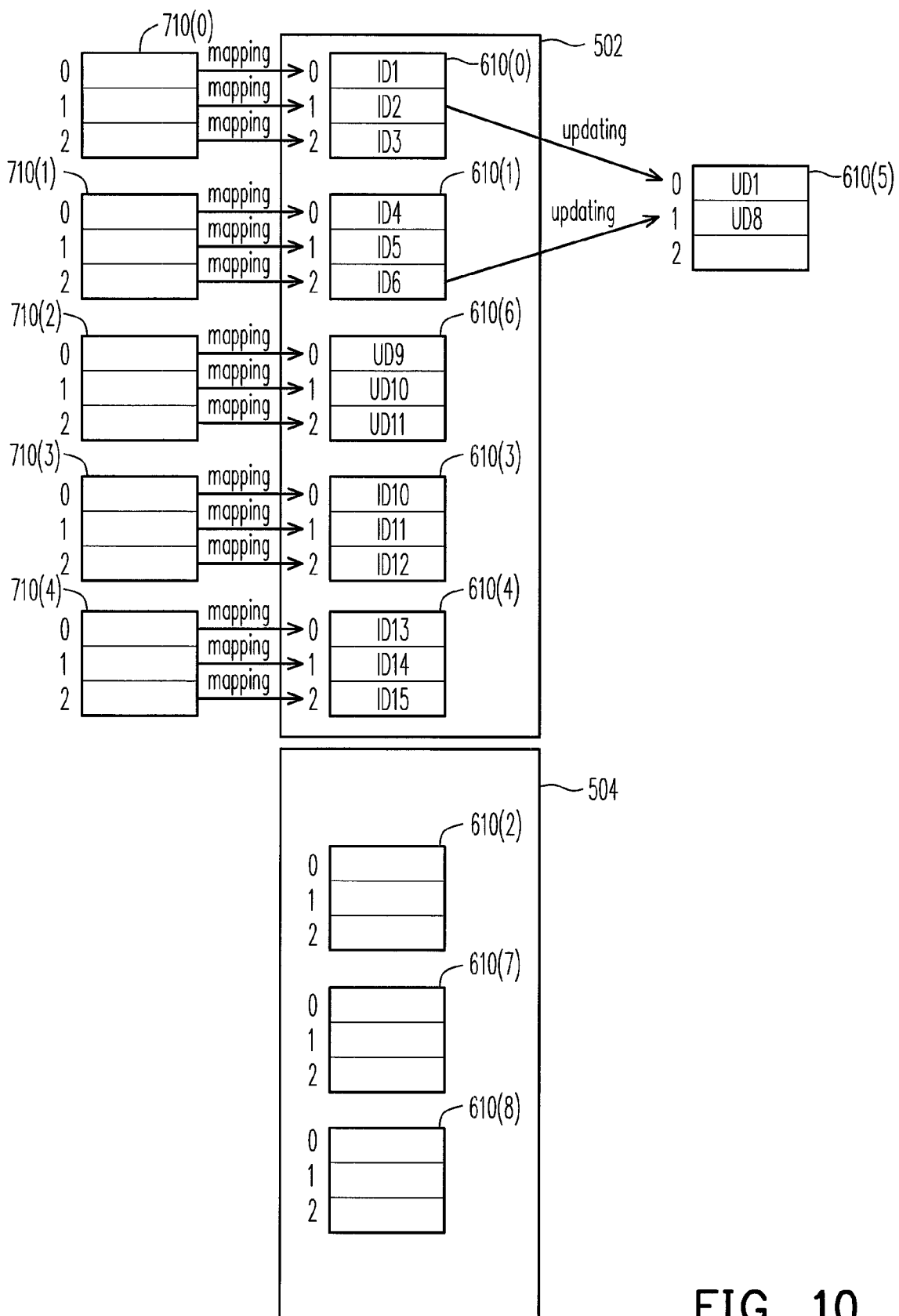
FIG. 10 is a schematic diagram of re-mapping logical units to physical units according to an exemplary embodiment of the present invention.

In the present exemplary embodiment, after writing the updated data, the memory management circuit 202 determines whether the current global random physical unit has stored complete valid data belonging to a certain logical unit. For example, after writing the updated data UD11, the memory management circuit 202 determines whether the physical unit 610(6) has stored complete valid data belonging to the logical unit 710(2). In particular, when the physical unit 610(6) has stored complete valid data belonging to the logical unit 710(2), the memory management circuit 202 re-maps the logical unit 710(2) to the physical unit 610(6) in the logical unit-physical unit mapping table, erases the data stored in the physical unit 610(2) originally mapped to the logical unit 710(2), and associates the erased physical unit with the free area 504 (as shown in FIG. 10). In more detail, in the example of FIGS. 8A-8D, the memory management circuit 202 writes the updated data belonging to the same logical unit among the pieces of updated data written in the sequential writing mode into the same global random physical unit. Therefore, when updated data stored in a global random physical unit is complete valid data belonging to a certain logical unit, the mapping relationship of the logical unit and the physical unit may be directly updated without executing the data merging procedure, thereby significantly improving performance of the memory storage apparatus 100.

Figure 11:
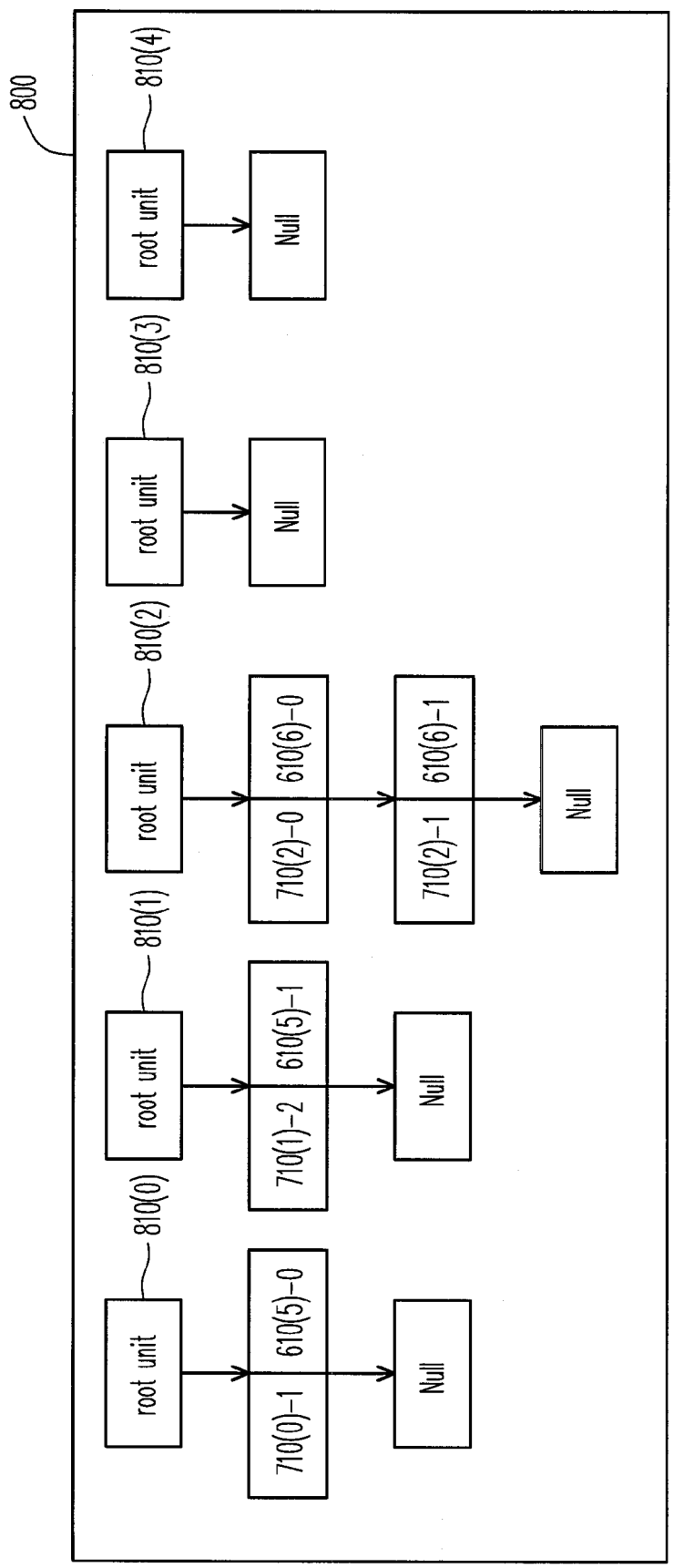
FIG. 11 illustrates a global random physical unit search table according to an example.

It is worth pointing out that in the present exemplary embodiment, if the host system 1000 only sequentially writes the updated data UD8, UD9, and UD10 into the $2^{nd}$ logical page of the logical unit 710(1) and the $0^{th}$ to $1^{st}$ logical pages of the logical unit 710(2), the global random physical unit (i.e. the physical unit 610(6)) will not store complete valid data belonging to the logical unit 710(2). Therefore, after finishing writing the updated data UD10, the memory management circuit 202 records the updated information of the $0^{th}$ and $1^{st}$ logical pages of the corresponding logical unit 710(2) in the global random physical unit search table 800 (as shown in FIG. 11).

Furthermore, in the example wherein the host system 1000 only sequentially writes the updated data UD8, UD9, and UD10 into the $2^{nd}$ logical page of the logical unit 710(1) and the $0^{th}$ to $1^{st}$ logical pages of the logical unit 710(2), in another exemplary embodiment of the present invention, the memory management circuit 202 may also copy the valid data (e.g. data ID9) stored in the physical unit 610(2) originally mapped to the logical unit 710(2) to the physical unit 610(6) and then directly update the mapping relationship between the logical unit and the physical unit.

Figure 12:
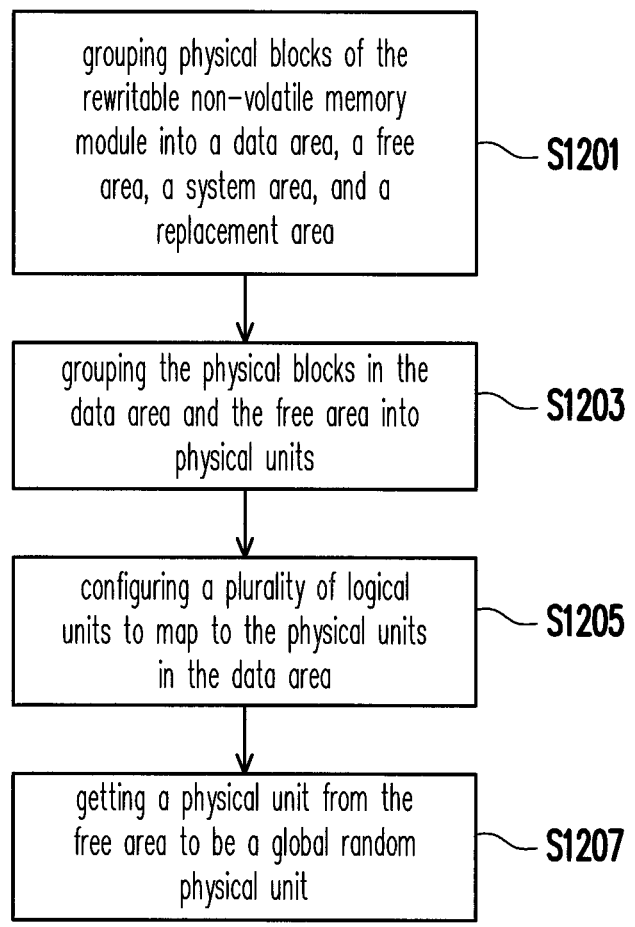
FIG. 12 is a flowchart illustrating the data writing method according to one exemplary embodiment of the present invention.

FIG. 12 is a flowchart illustrating the data writing method according to one exemplary embodiment of the present invention, which shows steps for initializing the rewritable non-volatile memory module before writing data.

Referring to FIG. 12, in step S1201, the memory management circuit 202 groups the physical blocks in the rewritable non-volatile memory module 106 into the data area 502, the free area 504, the system area 506, and the replacement area 508. Afterward, in step S1203, the memory management circuit 202 groups the physical blocks in the data area 502 and the free area 504 into physical units.

In step S1205, the memory management circuit 202 configures a plurality of logical units to map to the physical units in the data area 502, and in step S1207, the memory management circuit 202 gets a physical unit from the free area 504 to be a global random physical unit, wherein updated data belonging to a logical page is written into a physical page of the global random physical unit.

Figure 13:
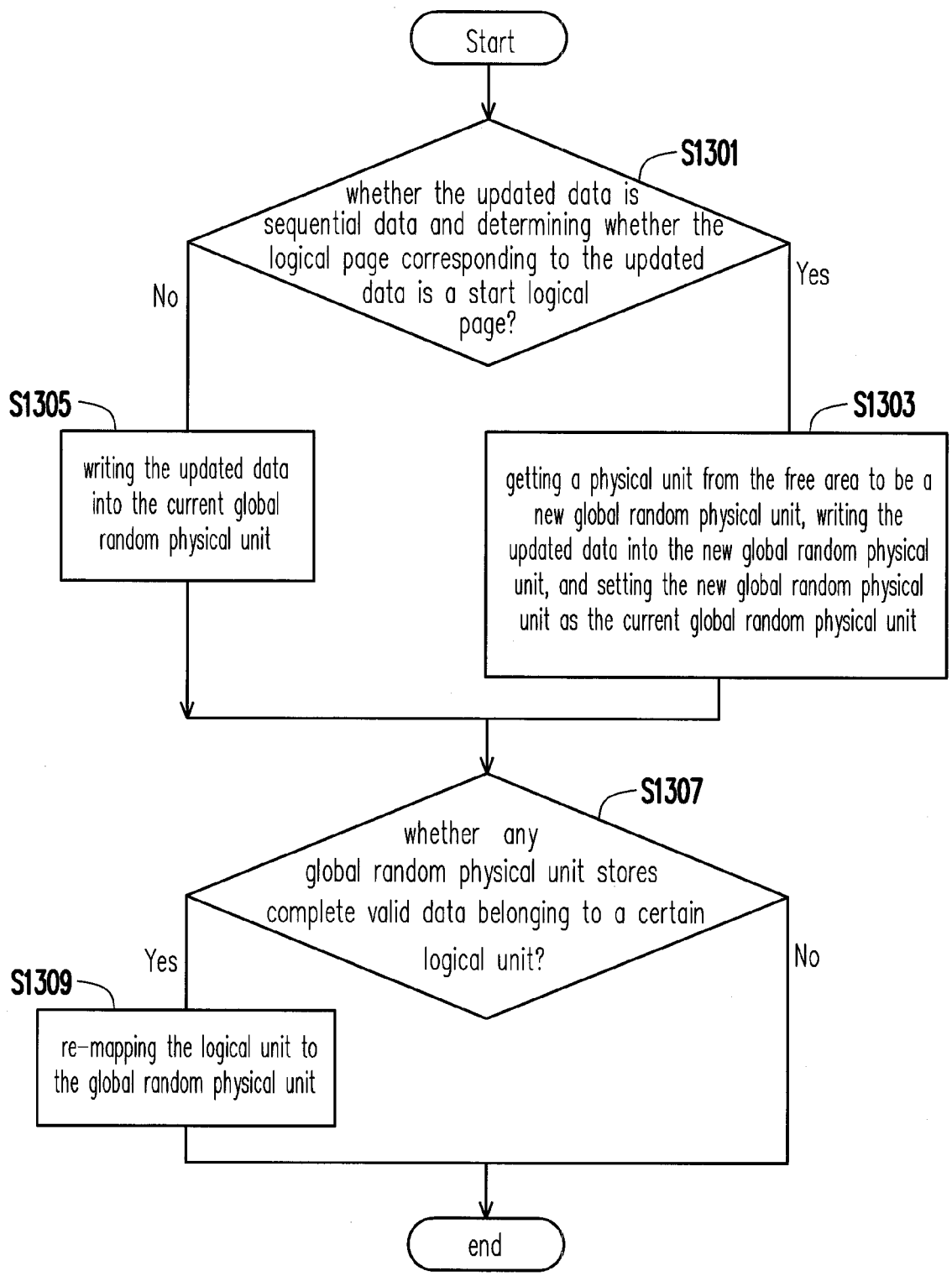
FIG. 13 is a schematic flowchart illustrating the data writing method according to one exemplary embodiment of the present invention.

FIG. 13 is a flowchart illustrating the data writing method according to one exemplary embodiment of the present invention, which shows steps for writing updated data from the host system into the rewritable non-volatile memory module.

Then, referring to FIG. 13, in step S1301, the memory management circuit 202 determines whether the updated data is sequential data and whether the logical page corresponding to the updated data is a start logical page.

If the updated data is sequential data and the logical page corresponding to the updated data is a start logical page, in step S1303, the memory management circuit 202 gets a physical unit from the free area 504 to be a new global random physical unit, writes the updated data into the new global random physical unit, and sets the new global random physical unit as a current global random physical unit (as shown in FIG. 8B).

If the updated data is not sequential data or the logical page corresponding to the updated data is not a start logical page, in step S1305, the memory management circuit 202 writes the updated data into the current global random physical unit.

Then, in step S1307, the memory management circuit 202 determines whether any global random physical unit stores complete valid data belonging to a certain logical unit.

If any global random physical unit stores complete valid data belonging to a certain logical unit, in step S1309, the memory management circuit 202 re-maps the logical unit to the global random physical unit.

Figure 14:
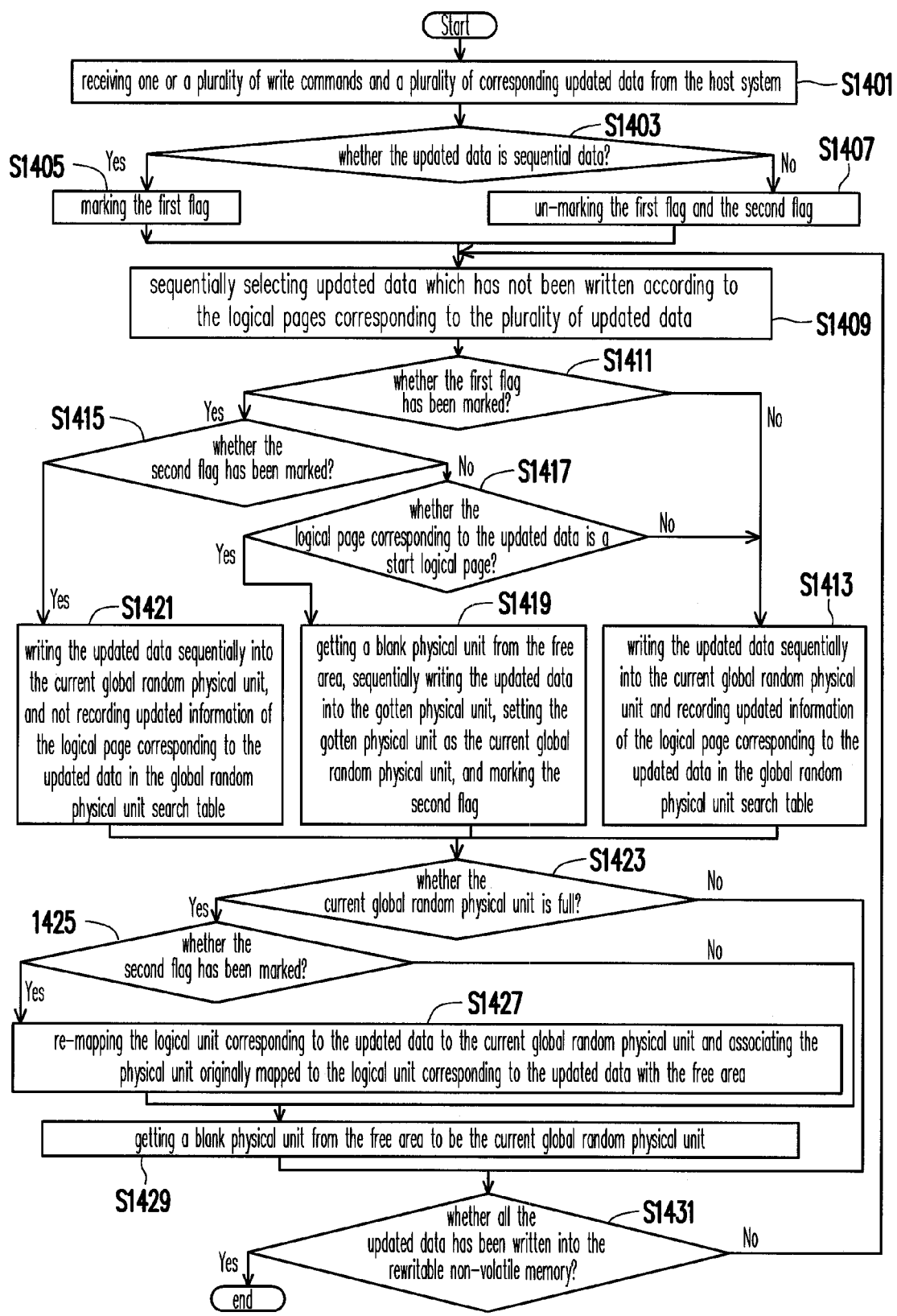
FIG. 14 is a detailed flowchart illustrating the data writing method according to one exemplary embodiment of the present invention.

FIG. 14 is a detailed flowchart illustrating the data writing method according to one exemplary embodiment of the present invention, wherein one physical unit of the free area 504 (e.g. the physical unit 610(5) in FIG. 8A) has been gotten to be the current global random physical unit.

Referring to FIG. 14, in step S1401, the memory management circuit 202 receives one or a plurality of write commands and a plurality of corresponding updated data from the host system 1000. Herein, each of the updated data corresponds to one of the logical pages (as shown in the example of FIGS. 8A-8D).

In step S1403, the memory management circuit 202 determines whether the updated data is sequential data (i.e. whether the host system 1000 writes the updated data in the sequential writing mode).

If the updated data is sequential data, in step S1405, the memory management circuit 202 marks the first flag (e.g. the value of the first flag is recorded as "1"). If the updated data is not sequential data, in step S1407, the memory management circuit 202 un-marks the first flag and the second flag (e.g. the values of the first flag and the second flag are recorded as "0").

Then, in step S1409, the memory management circuit 202 sequentially selects updated data which has not been written according to the logical pages corresponding to the plurality of updated data. In addition, in step S1411, the memory management circuit 202 determines whether the first flag has been marked.

If the first flag is not marked, in step S1413, the memory management circuit 202 writes the updated data sequentially into the current global random physical unit and records updated information of the logical page corresponding to the updated data in the global random physical unit search table.

If the first flag is marked, in step S1415, the memory management circuit 202 determines whether the second flag has been marked.

If the second flag is not marked, in step S1417, the memory management circuit 202 determines whether the logical page corresponding to the updated data is a start logical page.

If the logical page corresponding to the updated data is a start logical page, in step S1419, the memory management circuit 202 gets a blank physical unit from the free area 504 (e.g. the physical unit 610(6) in FIG. 8B), sequentially writes the updated data into the gotten physical unit, sets the gotten physical unit as the current global random physical unit, and marks the second flag (e.g. the value of the second flag is recorded as "1").

If the logical page corresponding to the updated data is not a start logical page, the memory management circuit 202 executes step S1413.

If the second flag is marked, in step S1421, the memory management circuit 202 writes the updated data sequentially into the current global random physical unit and does not record the updated information of the logical page corresponding to the updated data in the global random physical unit search table.

Afterward, in step S1423, the memory management circuit 202 determines whether the current global random physical unit is full.

If the current global random physical unit is full, in step S1425, the memory management circuit 202 determines whether the second flag has been marked. If the second flag is marked, in step S1427, the memory management circuit 202 re-maps the logical unit corresponding to the updated data to the current global random physical unit and associates the physical unit originally mapped to the logical unit corresponding to the updated data with the free area 504.

Afterward, in step S1429, the memory management circuit 202 gets a blank physical unit from the free area 504 to be the current global random physical unit.

Thereafter, in step S1431, the memory management circuit 202 determines whether all the updated data has been written into the rewritable non-volatile memory.

If not all the updated data has been written into the rewritable non-volatile memory, the memory management circuit 202 executes step S1409. If all the updated data has been written into the rewritable non-volatile memory, the process of FIG. 14 is terminated.

Based on the above, the memory management circuit 202 executes the write command from the host system 1000 according to the steps illustrated in FIG. 14. In particular, after the host system 1000 stores data in the sequential writing mode, the memory management circuit 202 determines whether the logical page corresponding to the next write command is continuous from the logical page corresponding to the previous write command. If the logical page corresponding to the next write command is not continuous from the logical page corresponding to the previous write command, the memory management circuit 202 un-marks the first flag and the second flag and records updated information that has not been recorded in the global random physical unit search table.

In summary, in the data writing method, memory controller and memory storage apparatus using the data writing method of the exemplary embodiments of the present invention, when the host system writes a large amount of sequential data, the logical units are quickly re-mapped to the global random physical unit, thereby reducing data merging. Furthermore, since the logical units can be directly re-mapped to the global random physical units, the numbers of recording updated information are also reduced. Accordingly, the efficacy of the memory storage apparatus is significantly enhanced. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method for writing updated data from a host system into a rewritable non-volatile memory module, wherein the rewritable non-volatile memory module has a plurality of physical blocks, each of the physical blocks has a plurality of physical pages, the physical blocks are grouped into at least a data area and a free area, the physical blocks belonging to the data area and the free area are grouped into a plurality of physical units, and the physical units in the free area are for substituting the physical units in the data area for writing data, the data writing method comprising:

configuring a plurality of logical units to map to the physical units in the data area, wherein each of the logical units has a plurality of logical pages, and the updated data belongs to one logical page among the logical pages;

getting at least one physical unit from the free area to be a first global random physical unit;

determining whether the updated data is sequential data and determining whether the one logical page is a start logical page of one logical unit among the logical units;

getting one physical unit from the physical units of the free area to be a second global random physical unit and writing the updated data into the second global random physical unit when the updated data is the sequential data and the one logical page is the start logical page, wherein the sequential data comprises data written sequentially by the host system into a plurality of continuous logical pages among the plurality of logical pages.

2. The data writing method according to claim 1, further comprising:

determining whether the second global random physical unit stores complete valid data belonging to the one logical unit; and re-mapping the one logical unit to the second global random physical unit when the second global random physical unit stores the complete valid data belonging to the one logical unit.

3. The data writing method according to claim 2, further comprising:

maintaining a global random physical unit search table to record a plurality of updated information corresponding to the logical pages.

4. The data writing method according to claim 3, further comprising:

not recording updated information corresponding to the one logical page in the global random physical unit search table after writing the updated data into the second global random physical unit.

5. The data writing method according to claim 4, further comprising:

recording the updated information corresponding to the one logical page in the global random physical unit search table when the second global random physical unit does not store the complete valid data belonging to the one logical unit.

6. The data writing method according to claim 1, further comprising:

writing the updated data into the first global random physical unit when the updated data is not the sequential data.

7. A memory controller for controlling a rewritable non-volatile memory module, wherein the rewritable non-volatile memory module has a plurality of physical blocks, and each of the physical blocks has a plurality of physical pages, the memory controller comprising:

a host interface, configured to couple to a host system;

a memory interface, configured to couple to the rewritable non-volatile memory module; and a memory management circuit, coupled to the host interface and the memory interface and configured to write updated data into the rewritable non-volatile memory module, wherein the memory management circuit is configured to group the physical blocks into at least a data area and a free area, and group the physical blocks belonging to the data area and the free area into a plurality of physical units, wherein the physical units in the free area are for substituting the physical units in the data area for writing data, wherein the memory management circuit is further configured to configure a plurality of logical units to map to the physical units in the data area, each of the logical units has a plurality of logical pages, and the updated data belongs to one logical page among the plurality of logical pages, wherein the memory management circuit is further configured to get at least one physical unit from the free area to be a first global random physical unit, wherein the memory management circuit is further configured to determine whether the updated data is sequential data and determining whether the one logical page is a start logical page of one logical unit among the logical units, wherein the memory management circuit is further configured to get one physical unit from the plurality of physical units in the free area to be a second global random physical unit and write the updated data into the second global random physical unit when the updated data is the sequential data and the one logical page is the start logical page, and wherein the sequential data comprises data written sequentially by the host system into a plurality of continuous logical pages among the plurality of logical pages.

8. The memory controller according to claim 7, wherein the memory management circuit determine whether the second global random physical unit stores complete valid data belonging to the one logical unit, wherein the memory management circuit re-maps the one logical unit to the second global random physical unit when the second global random physical unit stores the complete valid data belonging to the one logical unit.

9. The memory controller according to claim 8, wherein the memory management circuit is further configured to maintain a global random physical unit search table to record a plurality of updated information corresponding to the logical pages.

10. The memory controller according to claim 9, wherein the memory management circuit does not record updated information corresponding to the one logical page in the global random physical unit search table after writing the updated data into the second global random physical unit.

11. The memory controller according to claim 10, wherein the memory management circuit records the updated information corresponding to the one logical page in the global random physical unit search table when the second global random physical unit does not store the complete valid data belonging to the one logical unit.

12. The memory controller according to claim 7, wherein the memory management circuit is further configured to write the updated data into the first global random physical unit when the updated data is not the sequential data.

13. A memory storage apparatus, comprising:

a connector, configured to couple to a host system;

a rewritable non-volatile memory module, comprising a plurality of physical blocks, wherein each of the physical blocks has a plurality of physical pages; and a memory controller, coupled to the connector and the rewritable non-volatile memory module and configured to write updated data into the rewritable non-volatile memory module, wherein the memory controller is configured to group the physical blocks into at least a data area and a free area, and group the physical blocks belonging to the data area and the free area into a plurality of physical units, wherein the physical units in the free area are for substituting the physical units in the data area for writing data, wherein the memory controller is further configured to configure a plurality of logical units to map to the physical units in the data area, each of the logical units has a plurality of logical pages, and the updated data belongs to one logical page among the logical pages, wherein the memory controller is further configured to gets at least one physical unit from the free area to be a first global random physical unit, wherein the memory controller is further configured to determine whether the updated data is sequential data and determine whether the one logical page is a start logical page of one logical unit among the logical units, wherein the memory controller is further configured to get one physical unit from the plurality of physical units in the free area to be a second global random physical unit and write the updated data into the second global random physical unit when the updated data is the sequential data and the one logical page is the start logical page, wherein the sequential data comprises data written sequentially by the host system into a plurality of continuous logical pages among the logical pages.

14. The memory storage apparatus according to claim 13, wherein the memory controller determine whether the second global random physical unit stores complete valid data belonging to the one logical unit, wherein the memory controller re-maps the one logical unit to the second global random physical unit when the second global random physical unit stores the complete valid data belonging to the one logical unit.

15. The memory storage apparatus according to claim 14, wherein the memory controller is further configured to maintain a global random physical unit search table to record a plurality of updated information corresponding to the logical pages.

16. The memory storage apparatus according to claim 15, wherein the memory controller does not record updated information corresponding to the one logical page in the global random physical unit search table after writing the updated data into the second global random physical unit.

17. The memory storage apparatus according to claim 16, wherein the memory controller records the updated information corresponding to the one logical page in the global random physical unit search table when the second global random physical unit does not store the complete valid data belonging to the one logical unit.

18. The memory storage apparatus according to claim 13, wherein the memory controller is further configured to write the updated data into the first global random physical unit when the updated data is not the sequential data.

19. A data writing method for a rewritable non-volatile memory module, wherein the rewritable non-volatile memory module has a plurality of physical blocks, each of the physical blocks has a plurality of physical pages, the physical blocks are grouped into at least a data area and a free area, the physical blocks belonging to the data area and the free area are grouped into a plurality of physical units, the physical units in the data area are mapped to a plurality of logical units, each of the logical units has a plurality of logical pages, a first physical unit of the physical units in the free area is used as a current global random physical unit for writing data, the data writing method comprising:

(a) receiving from a host system at least one write command and a plurality of updated data corresponding to the at least one write command, wherein each of updated data corresponds to one logical page among the logical pages;

(b) determining whether the plurality of updated data are sequential data, wherein when the plurality of updated data are the sequential data, marking a first flag;

(c) sequentially selecting one updated data that has not been written among the plurality of updated data according to the logical pages corresponding to the plurality of updated data, and executing step (d);

(d) determining whether the first flag has been marked, wherein when the first flag has not been marked, executing step (h), and when the first flag has been marked, executing step (e);

(e) determining whether a second flag has been marked, wherein when the second flag has not been marked, executing step (f), and when the second flag has been marked, executing step (i);

(f) determining whether a logical page corresponding to the one updated data is a start logical page, wherein when the logical page corresponding to the one updated data is the start logical page, executing step (g), and when the logical page corresponding to the one updated data is not the start logical page, executing step h;

(g) getting a second physical unit from the physical units of the free area, sequentially writing the one updated data into the second physical unit, setting the second physical unit as the current global random physical unit, marking the second flag, and executing step (j);

(h) sequentially writing the one updated data into the current global random physical unit, recording updated information of the logical page corresponding to the one updated data in the global random physical unit search table, and then executing step (j);

(i) sequentially writing the one updated data into the current global random physical unit, not recording the updated information of the logical page corresponding to the one updated data in the global random physical unit search table, and executing step (j); and (j) determining whether all the plurality of updated data have been written into the rewritable non-volatile memory, wherein when not all the plurality of updated data have been written into the rewritable non-volatile memory, executing step (c), wherein the sequential data comprises data written sequentially by the host system into a plurality of continuous logical pages among the plurality of logical pages.

20. The data writing method according to claim 19, further comprising:

determining whether the current global random physical unit is full; and gettting a third physical unit from the physical units of the free area to be the current global random physical unit when the current global random physical unit is full.

21. The data writing method according to claim 20, further comprising:

determining whether the second flag is marked when the current global random physical unit is full, wherein when the second flag is marked, re-mapping one logical unit among the logical units to the current global random physical unit, and associating a physical unit originally mapped to the one logical unit with the free area, wherein the plurality of updated data stored in the current global random physical unit belong to the one logical unit.

22. The data writing method according to claim 21, further comprising:
- receiving at least another write command and a plurality of other updated data corresponding to the at least another write command from the host system, wherein each of the plurality of other updated data corresponds to one logical page among the logical pages; and
- respectively writing the plurality of other updated data into the global random physical units according to the above steps (e), (f), (g), (h), (i), and (j).

23. The data writing method according to claim 22, further comprising:
- determining whether the logical pages corresponding to the plurality of other updated data are continuous from the logical pages corresponding to the plurality of updated data,
- wherein when the logical pages corresponding to the plurality of other updated data are not continuous from the logical pages corresponding to the plurality of updated data, un-marking the first flag and the second flag, and recording at least one updated information of the plurality of updated information of the logical pages corresponding to the plurality of updated data in the global random physical unit search table.

* * * * *